(12) United States Patent
Gloe

(10) Patent No.: US 7,734,745 B2
(45) Date of Patent: Jun. 8, 2010

(54) METHOD AND APPARATUS FOR MAINTAINING INTERNET DOMAIN NAME DATA

(75) Inventor: Christopher Thomas Gloe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2304 days.

(21) Appl. No.: 10/279,789

(22) Filed: Oct. 24, 2002

(65) Prior Publication Data

US 2004/0083306 A1    Apr. 29, 2004

(51) Int. Cl.
G06F 15/173 (2006.01)
(52) U.S. Cl. .................. 709/223; 709/226; 709/245
(58) Field of Classification Search ............ 709/226, 709/245, 223, 224
See application file for complete search history.

(56) References Cited

U.S. PATENT DOCUMENTS

| | | | |
|---|---|---|---|
| 5,862,231 A | | 1/1999 | Tokuhisa |
| 6,101,499 A | * | 8/2000 | Ford et al. .................. 707/10 |
| 6,119,171 A | | 9/2000 | Alkhatib |
| 6,243,749 B1 | | 6/2001 | Sitaraman et al. |
| 6,262,987 B1 | | 7/2001 | Mogul |
| 6,282,281 B1 | | 8/2001 | Low |
| 6,286,039 B1 | | 9/2001 | Van Horne et al. |
| 6,338,082 B1 | | 1/2002 | Schneider |
| 2001/0039585 A1 | | 11/2001 | Primak et al. |
| 2001/0052007 A1 | | 12/2001 | Shigezumi |
| 2001/0052016 A1 | | 12/2001 | Skene et al. |
| 2002/0007413 A1 | | 1/2002 | Garcia-Luna-Aceves |
| 2002/0010767 A1 | * | 1/2002 | Farrow et al. .................. 709/223 |
| 2002/0010794 A1 | * | 1/2002 | Stanbach, Jr. et al. ......... 709/245 |
| 2002/0010798 A1 | | 1/2002 | Ben-Shaul et al. |
| 2002/0046293 A1 | * | 4/2002 | Kabata et al. .................. 709/245 |
| 2004/0068566 A1 | * | 4/2004 | Ogawa ........................... 709/226 |

FOREIGN PATENT DOCUMENTS

FR    2801754 B1    6/2001

OTHER PUBLICATIONS

"Domain name information as part of the browser", Research Disclosure No. 442127, Feb. 2001, p. 295.
"Method to Pass a Name for a Point-to-Point Protocol Client to Dynamic Domain Name Server", IBM Tech Disc. Bulletin vol. 40, No. 11 (Nov. 1997).

(Continued)

*Primary Examiner*—Lashonda T Jacobs
(74) *Attorney, Agent, or Firm*—Roy W. Truelson

(57) ABSTRACT

A host node connected to the Internet automatically generates an Internet interface addresses for itself, and automatically generates a request to an Internet domain name server to update the domain name server's database with the self-generated address. Preferably, the node employs a draft standard stateless address autoconfiguration protocol to create a link-local address, find a router, obtain a prefix from the router, and generate a global address from the prefix and the link-local address. Preferably, the node automatically determines the identity of its master domain name server, and transmits a request to update the master's database using a BIND 8 (or subsequent) protocol. Such a request may be encrypted for security and may include a self-generated identity key for further security.

40 Claims, 9 Drawing Sheets

OTHER PUBLICATIONS

Hoffman, "Address Administration in IPv6" (Oct. 1996).

Hinden & Deering, "IP Version 6 Addressing Architecture", RFC 2373, The Internet Society (Jul. 1998).

Thomson & Narten, "IPv6 Stateless Address Autoconfiguration", RFC 2462, The Internet Society (Dec. 1998).

Vixie, Thomson, Rekhter & Bound, "Dynamic Updates in the Domain Name System (DNS Update)", RFC 2136, The Internet Society (Apr. 1997).

Vixie, Gudmundsson, Eastlake & Wellington, "Secret Key Transaction Authentication for DNS (TSIG)", RFC 2845, The Internet Society (May 2000).

Thaler & Hagino, "IPv6 Stateless DNS Discovery", work in progress, The Internet Society (Mar. 2002).

Mockapetris, "Domain Names—Concepts and Facilities", RFC 1034 (Nov. 1987).

Hind, et al; U.S. Appl. No. 09/435,415, filed Nov. 8, 1999, "Using Device Certificates to Authenticate Servers Before Automatic Address Assignment".

* cited by examiner

METHOD AND APPARATUS FOR MAINTAINING INTERNET DOMAIN NAME DATA

FIELD OF THE INVENTION

The present invention relates to the use of the Internet, and in particular, to the maintenance of domain name databases used on the Internet.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is now economically feasible to manipulate via computer. The reduced cost of information processing drives increasing productivity in a snowballing effect, because product designs, manufacturing processes, resource scheduling, administrative chores, and many other factors, are made more efficient.

The reduced cost of computing and the general availability of digital devices has brought an explosion in the volume of information stored in such devices. With so much information stored in digital form, it is naturally desirable to obtain wide access from computer systems. The volume of information dwarfs the storage capability of any one device. To improve information access, various techniques for allowing computing devices to communicate and exchange information with one another have been developed. Perhaps the most outstanding example of this distributed computing is the World Wide Web (often known simply as the "web"), a collection of resources which are made available throughout the world using the Internet. People from schoolchildren to the elderly are learning to use the web, and finding an almost endless variety of information from the convenience of their homes or places of work. Businesses, government, organizations and even ordinary individuals are making information available on the web, to the degree that it is now the expectation that anything worth knowing about is available somewhere on the web.

The Internet, which provides the support for the web as well as for e-mail and other forms of communication and distributed processing among multiple digital systems, is a heterogeneous network of digital devices (nodes) connected by multiple links, so that between any two nodes of the network there are typically multiple paths, giving the Internet some degree of redundancy. In order to support communication between any two arbitrary nodes coupled to the Internet, a global naming convention is used to assign a unique name to each node. This naming convention is known as the Domain Name System, or DNS.

A source node connected to the Internet, having only the global DNS name of a target node, can send a data packet to the target, allowing the various routers, servers and other devices on the Internet to determine a path and final destination node for the data packet. As part of this routing process, it is necessary to translate a global name in the DNS to an interface address of the target node which is used at the communications link level. Name-to-address translation is accomplished by one or more domain name servers connected to the Internet. Each domain name server provides name-to-address translation for nodes within a respective zone. Specifically, this means that each domain name server maintains a database of names and addresses, which it uses to respond to external queries requesting name-to-address translation information.

As the Internet has evolved, the task of maintaining the databases in the domain name servers has accordingly grown in scope and complexity. Originally, it was anticipated that the domain server databases would be relatively static databases maintained by manual editing. The massive increase in number of nodes and uses to which they are put has induced changes to the underlying Internet protocols. The most recent protocol, Internet Protocol Version 6 (IPv6), supports interface addresses which have limited lifetimes, expiring by their own terms at the end of the defined lifetime. With these and other changes, it is expected that the number of interface addresses per node may increase dramatically, and that the set of current valid addresses may be subject to frequent change. The burden of maintaining the domain name server database is accordingly increased.

A set of application interfaces has been defined which permits authorized clients to add, delete or edit records in a domain name server's database. These application interfaces have been used by certain special configuration servers known as DHCP servers. A DHCP server assists the configuration process by defining interface addresses for a set of nodes, and providing names and addresses to the domain name server. As useful as these DHCP servers are, they provide only an incomplete solution to the problem of maintaining domain name server databases. A separate DHCP server entity must be established for some set of nodes, which itself must be defined, configured and maintained. Such a DHCP server will not always be available.

The advent of IPv6 and the continued growth and maturation of the Internet is likely to overwhelm conventional processes for maintaining the domain name server databases. A need therefore exists for improved techniques for maintaining domain name server data, particularly in view of interface addresses which expire and change frequently. Moreover, unlike many databases used in environments of somewhat limited scope, it is impossible, or at best extremely difficult, to modify the external behavioral parameters of the database, since any domain name server must continue to provide service according to the various applicable Internet protocols and on the assumption that at least some of the devices requesting service may be operating according to an older level of protocol. Any technique for maintaining domain name server databases should therefore be consistent with existing Internet protocols.

SUMMARY OF THE INVENTION

In accordance with the present invention, a host node connected to the Internet automatically generates one or more Internet interface addresses for itself, and automatically generates a request to an Internet domain name server to update the domain name server's database with the Internet interface address it generates.

In the preferred embodiment, the node employs the draft standard stateless address autoconfiguration feature of IPv6 to create a link-local address and to verify the uniqueness of this link-local address within the local link mechanism. The node then determines the existence of a router from a router advertisement, and generates a global address by appending the link-local address to a prefix associated with the router.

Preferably, after generating an Internet address, the node automatically determines the identity of its master domain name server by determining the identity of a local domain name server using the procedure described in "Stateless DNS Discovery" according to a work-in-progress draft revision of the Internet protocols, and obtaining the identity of the master DNS server from the local DNS server. The node preferably obtains an encryption key from the local DNS server for encrypting communications with the master DNS server, and may provide further security by generating its own identity key.

Preferably, manual configuration ("stateful configuration") of addresses in both IPv6 and IPv4 is concurrently supported as an alternative for devices lacking the autoconfiguration capabilities described herein or for other special cases.

Updates of the domain name server database may be accomplished using any recognized protocol, and in particular using the "BIND 8" or "BIND 9" (or subsequent) API protocol for making changes to resource records of the domain name server database. I.e, the node, having generated one or more Internet addresses and determined its domain name server, employs a set of APIs such as BIND 8 or BIND 9 to update the domain name server database to reflect the domain name and corresponding Internet interface address (es) of the node.

The capability of different nodes for which a domain name server maintains domain name information to access the domain name server and modify their own records in the server can further be used to modify records when Internet addresses expire or new addresses are assigned to a node.

Providing a means for individual nodes to maintain their own records in the domain name server database substantially reduces the amount of manual database maintenance and/or need for special servers such as DHCP servers. Specifically, new nodes can automatically generate and verify Internet addresses, discover the domain name server, and update the domain name server database, without any external intervention required. Subsequent changes to the records, as when an address expires, can similarly be made automatically. At the same time, this technique is compatible with existing Internet protocols, and does not prevent older devices (which may lack self-configuration or other necessary capabilities) from being configured in the domain name server in accordance with any of various conventional practices, whether in whole or in part.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview

Prior to discussing the operation of embodiments of the invention, a brief overview discussion of the Internet is provided herein.

The term "Internet" is a shortened version of "Internetwork", and refers commonly to a collection of computer networks that utilize the TCP/IP suite of protocols, well-known in the art of computer networking. TCP/IP is an acronym for "Transport Control Protocol/Internet Protocol", a software protocol that facilitates communications between computers.

Figure 1:
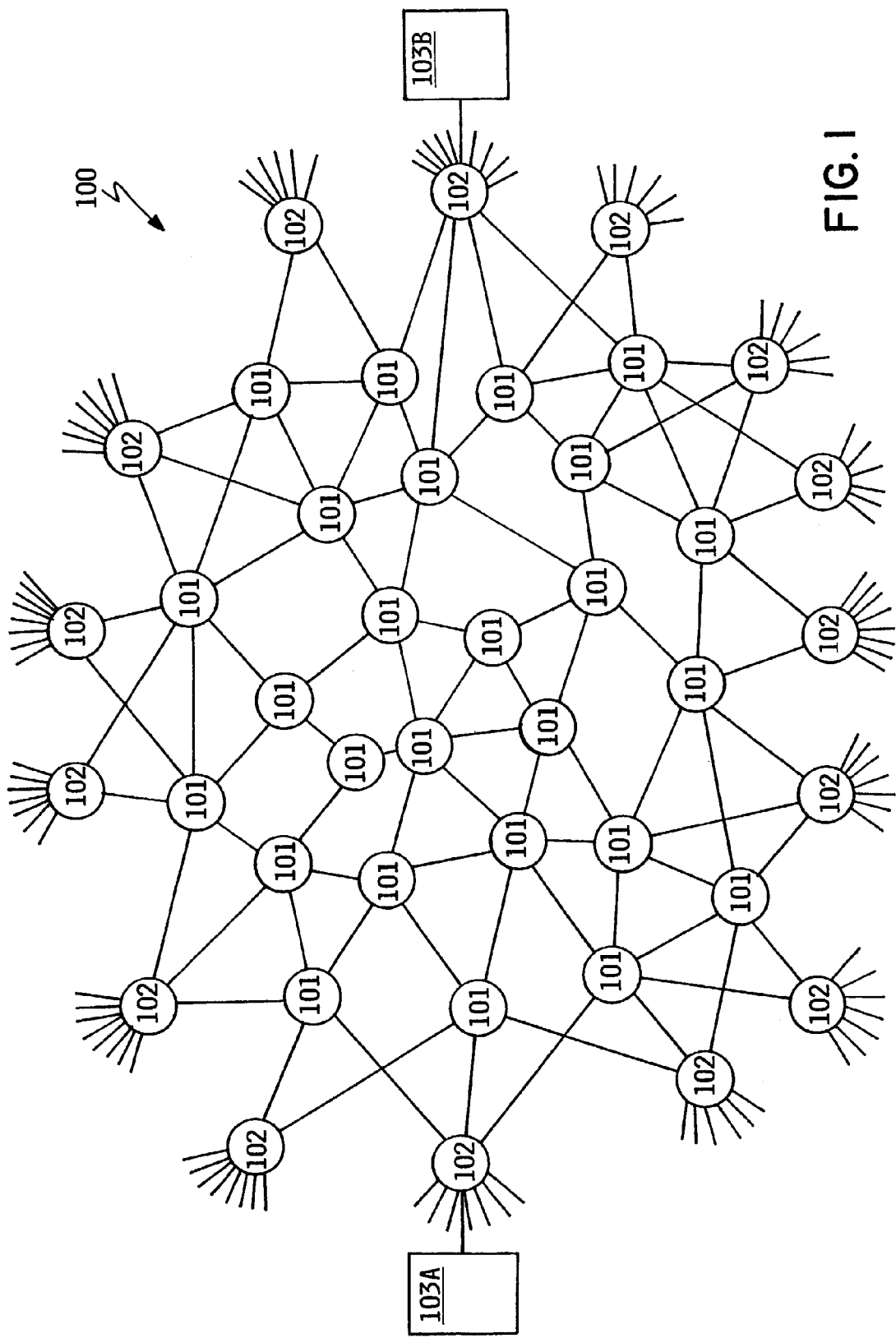
FIG. 1 is a high-level conceptual view of the Internet

FIG. 1 is a high-level conceptual view of the Internet. The Internet has no pre-established topology, and is indefinitely extensible by adding new nodes and links. A node may have any number of links connecting it to other nodes, and these may use any of various communications technologies, having different data capacities and other characteristics. The topology of the Internet therefore becomes an extremely complex interconnected network, in which there are typically a large number of possible pathways between any two nodes.

The central part of the network, sometimes called the "backbone", contains multiple high-speed routers 101 which receive data packets and forward these on to other nodes in the network. Typically, each router has multiple connections to other routers, and these connections have a high data capacity. For example, fiber optic links are often used between high-speed routers 101. Connected to the high-speed routers are nodes which serve as access points to the Internet "backbone" of high-speed routers, illustrated in FIG. 1 as nodes 102. Access nodes 102 are also routers since they function to route data packets between the high-speed routers 101 and other network nodes, but they typically employ lower-speed connections. An access node may be, for example, a public Internet Service Provider which provides access to the Internet through telephone lines or other connections for a fee, or may be an access node of a large company for its internal systems. Usually, each access node 102 connects to multiple high-speed routers 101 to provide redundancy, although this is not a requirement. Each access node typically provides access to multiple host computer systems 103A, 103B (referred to generically as reference numeral 103), of which only two are illustrated in FIG. 1. Hosts 103 are the computer systems which connect to the Internet and which generate as the source or receive as the ultimate destination the data packets transmitted over the Internet. Hosts 103 may be any type of computer system, from large mainframe systems to PCs to handheld portable devices. Often, a host has only one access node 102 which it uses to access the Internet (in which case it is non-redundant), although it may have multiple such access nodes for redundancy. The connection between the host and the access node is often relatively low speed (such as a telephone line or radio frequency link), but could be a high-speed link. In the case of some computer systems, such as large Internet servers which function primarily to provide information over the Internet, the host may be connected directly to high-speed routers 101 and therefore serve as its own access node.

It will be understood that FIG. 1 is intended as a conceptual illustration of the Internet, and that in reality the number of nodes and connections on the Internet is vastly larger than illustrated in FIG. 1, and that the topology of the connections may vary. Furthermore, it will be understood that there may be further hierarchies of types of connections and forms of access, which are not shown in FIG. 1 for clarity of illustration. I.e., there may be multiple types or classes of access node 102 through which a host connects to reach the high-speed routers 101 of the backbone, and that different hosts may connect at different levels of access node. Strictly speaking, the Internet comprises all devices coupled to it, and when a small computer system such as a PC is logged on to the Internet, it is part of the Internet in the sense that it becomes an Internet node and has an address (although the address may be only temporary). Often, the routers and connections of the Internet backbone and access nodes are referred to as the Internet, i.e., the Internet is viewed as a communications medium as opposed to a distributed processing network of computer systems. Depending on the context, either usage may be employed.

In order to enable communication of data in any network from one arbitrary node to another, the sending node must specify the destination of the receiving node. For very small networks, such as a local area Ethernet network, it is possible to broadcast data to all nodes in the network, identifying the desired recipient with a simple addressing scheme. The size of the Internet makes such an approach impractical. It is still necessary for the sender to specify a destination, but it is not practical to transmit the data to every node in the network until the destination is found. This means that the sender, and every node in between the sender and recipient in the pathway, must be able to make a determination where to route the data so that it reaches its destination. Generally, there will be multiple possible routes and a router may decide which to use based on various factors.

At the level of the router hardware, an Internet destination node is specified by a multi-bit numerical address, called an IP address. The original Internet addressing system used a 32-bit IP address divided into four parts or "octets" of 8 bits each. These octets are often written separated by periods, e.g., an IP address might be written as: 90.4.63.18. The octets are a hierarchical form of addressing, and it is not necessary for any single router to know the ultimate destination of all Internet addresses. A data packet bearing a distant address will be routed to a router which is closer and therefore able to further refine the address, and so on until the data packet reaches its ultimate destination. Although the original addressing system used a 32-bit IP address, in recent years the Internet address space has become constrained, and a new standard, known as IPv6, has been adopted for Internet IP addresses. IPv6 supports IP addresses of 128 bits. IPv6 is currently being phased in, and many Internet devices still use the older 32-bit IP addressing protocol.

An IP address allows a sending node to route a data packet to a receiving node, but there would be drawbacks to using a numerical IP address for higher-level interprocess communications using the Internet. For one thing, numerical addresses are hard for people to remember. Additionally, some IP addresses might be shared among multiple nodes, or might change due to changes in network configuration. For these and other reasons, a higher level naming convention for Internet nodes exists, which is called the Domain Name System (DNS). Internet nodes are given names in the DNS having arbitrary alphabetic characters, which are then translated to IP addresses. The DNS name of a node can thus be made easier to remember, and need not change simply because some hardware has changed. For example, a person can establish a web server having a familiar DNS name which clients are likely to remember, and can maintain the same DNS name even if the actual IP address of the web server changes due to hardware upgrades and so forth.

Due to the size and dynamic nature of the Internet, it is almost impossible to maintain a single large record of all DNS names and their corresponding IP addresses. The Internet's DNS therefore employs a distributed form of address record keeping, in which DNS names are hierarchical. A DNS name comprises multiple text character portions, each separated by a period, the portions representing a naming hierarchy, proceeding left to right from most specific to most general. Thus, the right-most name portion is reserved for the root part of the name, and may contain values such as "com", "edu", "org", "net", "gov", etc. These are the names which are part of familiar uniform resource locators (URLs) and e-mail addresses, although both may have additional fields specifying other data. Each name is translated to an IP address. For example, the name "www.ibm.com" represents the web server for IBM Corporation's home page on the world wide web. When a source node, such as a PC executing an Internet browser application, attempts to send data to the domain name "www.ibm.com", one or more domain name servers are invoked to translate this domain name to an IP address, and the IP address is then used to route the data packet through the Internet's routers to the web server for IBM.

A name is resolved to an address in a hierarchical fashion, which may take multiple steps. The sender first accesses its own DNS name server to request a translation of the name (each node must at the very least have the IP address for its name server, and therefore this server is always available without the need to translate an address). If we assume that a name will be translated from scratch, the name server first accesses a DNS server for the root part of the destination name. For example, in the case of "www.ibm.com", a DNS server for "com" is accessed. This DNS server should be able to identify the next level of the name, i.e., to find a DNS Server for "ibm". The DNS server for "ibm" is then accessed, and it should be able to identify the IP address for "www.ibm.com". The number of steps may vary, since the number of name portions may vary and the DNS database for any part of the name may itself be maintained on hierarchical servers. In reality, most DNS servers cache a large number of names and IP addresses, so it is not always necessary to follow all the translation steps described above from the root DNS server on down.

For any given node, there is always at least one DNS server which maintains domain names and addresses at the lowest level of the hierarchy. When this DNS server is reached during a traversal of the various DNS servers which maintain portions of a name, the list of IP addresses associated with that node can be obtained. The set of nodes for which such a low level DNS server maintains names and IP addresses is called the zone of the server. Typically, there will be multiple DNS servers for each zone which synchronize their records in some fashion, e.g., one server maintains a master copy of the domain name database, while others have shadow copies of the database. The use of multiple DNS servers provides redundancy as well as the additional processing power of the multiple servers.

DETAILED DESCRIPTION

Figure 2:
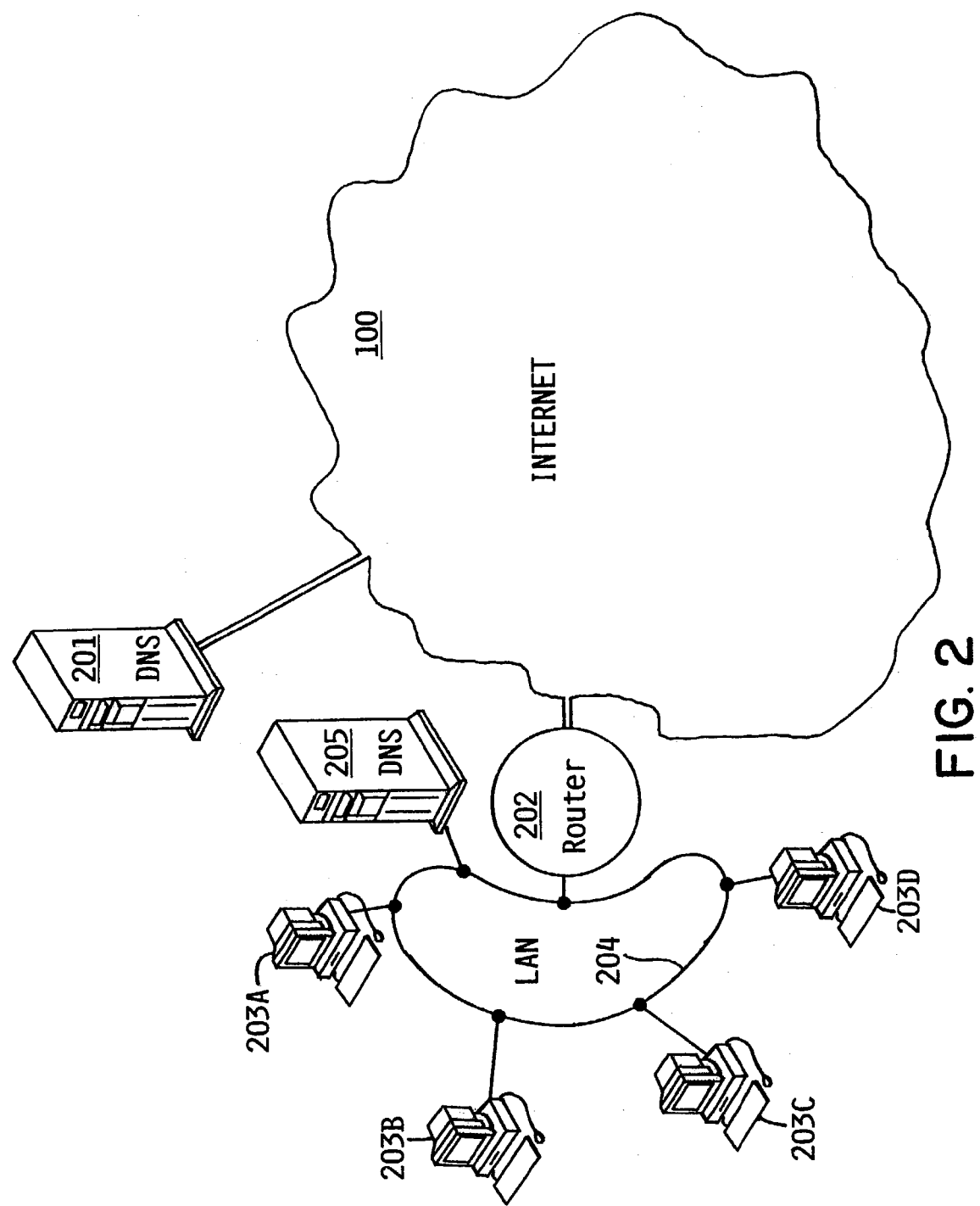
FIG. 2 is a high-level illustration of the major components of an Internet environment for maintaining Internet domain names, in accordance with the preferred embodiment.

Referring to the Drawing, wherein like numbers denote like parts throughout the several views, FIG. 2 is a high-level illustration of an Internet environment, showing some of the major components involved in a system which automatically maintains certain domain name database information, in accordance with the preferred embodiment of the present invention. As shown in FIG. 2, a master domain name server 201 for a zone of Internet nodes is coupled to the Internet 100. A router 202 is also coupled to the Internet, and serves as an access node for host computers 203A-203D (referred to generically as reference numeral 203). Host computers 203 and router 202 communicate with each other over communications medium 204, which is preferably a local area network (LAN). A local domain name server 205 is also attached to LAN 204, and provides domain name translation for hosts 203 attached to the LAN. In the strictly technical sense, local DNS 205 is also a "host", but it is identified separately from hosts 203 for clarity. Router 202, hosts 203 and local DNS 205 are in the zone of domain name server 201. In the preferred embodiment, host nodes 203 are self-configuring nodes which generate their own IP address(es) and identify the router and domain name server for their domain, as explained more fully herein. As explained earlier, master domain name server 201 is an Internet node having an IP address, as are router 202, hosts 203, and local DNS 205, and to this extent they are actually part of the Internet. However, for illustrative purposes these nodes are shown separately in FIG. 2.

Medium 204 may be any communications medium which allows hosts 203 and local DNS 205 to communicate with router 202. For example, medium 204 might be an Ethernet or a Token Ring local area network, as might typically be the case in a business enterprise having multiple internal nodes which communicate with each other, and which have an external connection through router 202 to the Internet. Although medium 204 is described in the exemplary embodiment herein as a local area network, it is not necessarily a local area network, and could take some other form. For example, the communications medium could be the telephone system, or a radio frequency transmission medium, or any of various other communications media. Preferably, medium 204 supports direct communications among any of hosts 203A-203D or local DNS 205, although it is also possible that it only supports communications between a host 203 or local DNS 205 and router 202, in which case any data sent from one of hosts 203 to another must go through the router.

Although a single master domain name server 201, a single router 202, a single local DNS server 205, and four host computer systems 203A-203D are shown in the simplified illustration of FIG. 2, it will be understood that the actual number and type of such components may vary. As explained previously, there will typically be multiple redundant domain name servers, of which one is a master. There may be additional slave domain name servers (not shown) for the zone of hosts 203. It is also possible that servers 201 and 205 and one and the same, i.e., that the master domain name server for the zone of hosts 203 is on LAN 204, although for generality it is assumed herein that this is not the case. LAN 204 could attach to multiple routers providing multiple access nodes to the Internet (and hence providing redundancy). The number of hosts 203 attached to LAN 204 may vary, and is typically larger than four. Moreover, although desktop workstations are illustrated as hosts 203, it will be understood that a host could be any device (other than a router, which may have a DNS name and address, but is not considered a "host") having an Internet address, from large mainframe computer systems to small portable devices such as personal digital assistants (PDAs) and laptops.

Figure 3:
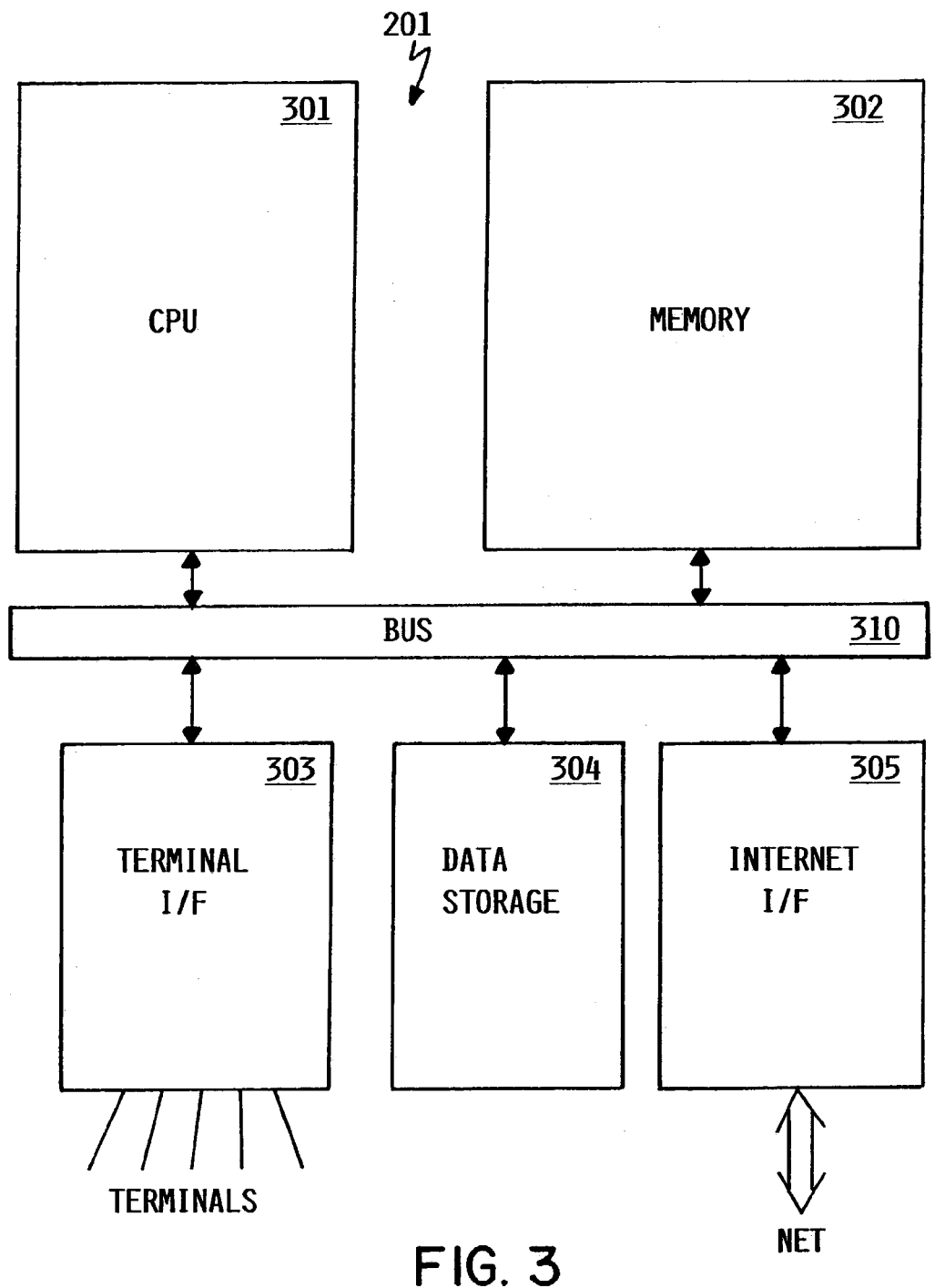
FIG. 3 is a high-level block diagram of a domain name server computer system, according to the preferred embodiment.

Domain name servers 201, 205 are preferably high-performance general-purpose computer systems which are suitably programmed to maintain a domain name database and respond to requests for database access. FIG. 3 shows a high-level block diagram of domain name server computer system 201 acting as a central repository of domain name database information, consistent with the preferred embodiment, it being understood that system 205 may be similar. DNS server system 201 comprises central processing unit (CPU) 301, main memory 302, terminal interface 303, data storage 304, and Internet interface 305. The various devices communicate with each other via internal communications bus 310. CPU 301 is a general-purpose programmable processor, executing instructions stored in memory 302; while a single CPU is shown in FIG. 3, it should be understood that computer systems having multiple CPUs could be used. Memory 302 is a random-access semiconductor memory for storing data and programs; memory is shown conceptually as a single monolithic entity, it being understood that memory is often arranged in a hierarchy of caches and other memory devices. Terminal interface 303 provides a connection for the attachment of a single or multiple terminals, and may be implemented in a variety of ways. Many large server computer systems (mainframes) support the direct attachment of multiple terminals through terminal interface I/O processors, usually on one or more electronic circuit cards. Alternatively, interface 303 may provide a connection to a local area network to which terminals are attached. Various other alternatives are possible. Data storage 304 preferably comprises one or more rotating magnetic hard disk drive units, although other types of data storage could be used. Internet interface 305 provides a physical connection for transmission of data to and from the Internet, and could use any of various available technologies. Communications bus 310 supports transfer of data, commands and other information between different devices; while shown in simplified form as a single bus, it is typically structured as multiple buses, and may be arranged in a hierarchical form. The DNS server system shown in FIG. 3 is intended to be a simplified representation, it being understood that many variations in system configuration are possible in addition to those specifically mentioned here. While a domain name server system could conceivably be any of various types of digital system, the volume of Internet traffic typically means that master DNS server 201 should be supported on relatively large computer system such as an IBM zSeries™ system. Local DNS server 205 might be a smaller system.

Figure 4:
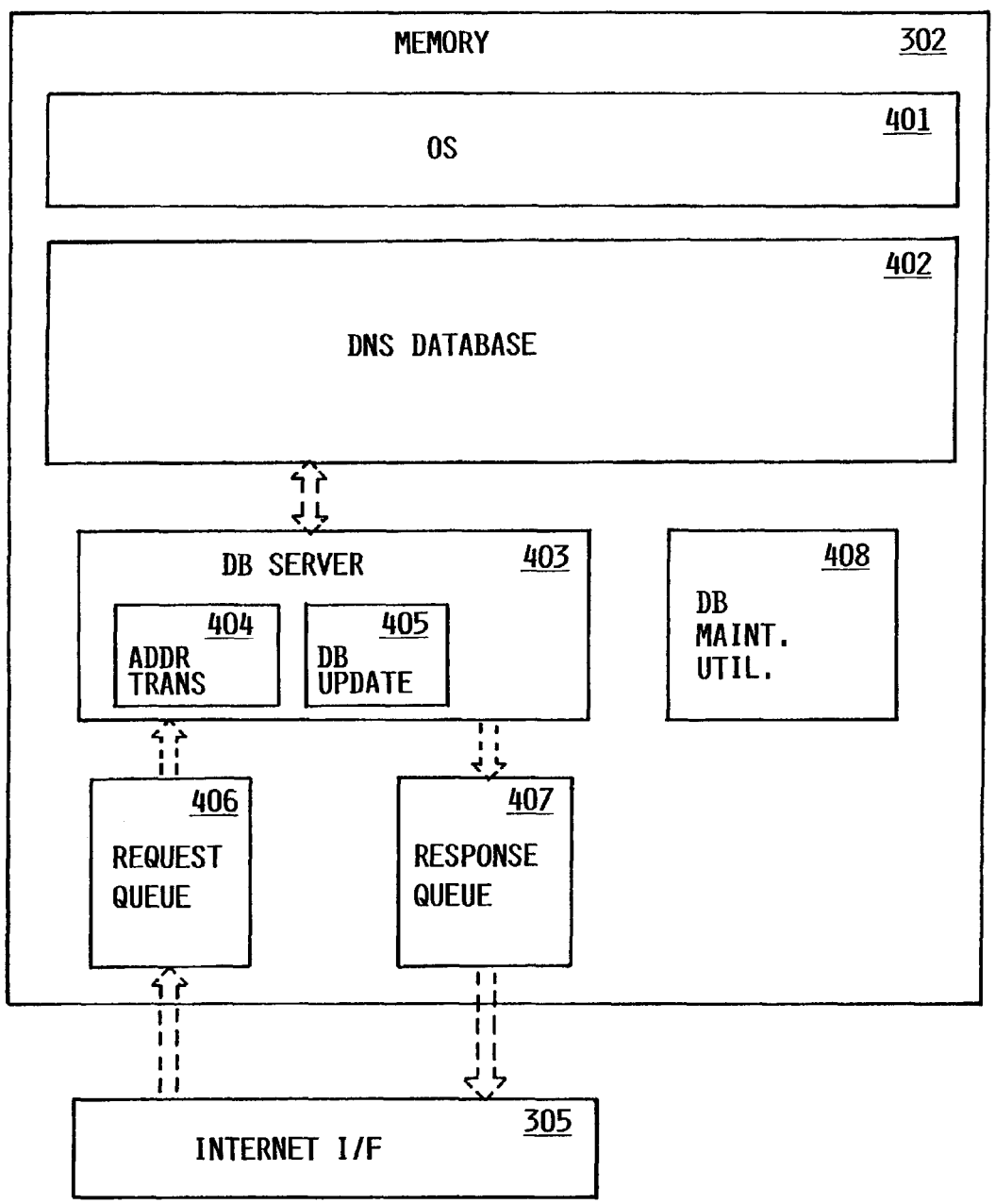
FIG. 4 is a conceptual illustration of the major software components in a domain name server computer system, according to the preferred embodiment.

FIG. 4 is a conceptual illustration of the major software components of memory 302 in DNS server system 201. Operating system 401 is executable code and state data providing various low-level software functions, such as device interfaces, management of memory pages, management of multiple tasks, etc. as is well-known in the art. A DNS database 402, which is maintained by DNS system 201, contains domain name data, IP address data, and other data, for nodes within an Internet zone, from which it is possible to translate any given domain name for a node within the zone to the corresponding IP addresses of the node. DNS database 402 is a dynamic database which is updated on a continuing basis, as described more fully herein. Database server 403 is an executable program which provides access to and maintenance of database 402 through external (i.e., Internet) requests. Maintenance utility 408 provides an alternative form of database maintenance.

Request queue 406 temporarily stores requests to access database 402, the requests being received over the Internet (through Internet interface hardware 305) from various client nodes coupled to the Internet. Requests from request queue 406 are serviced generally by database server 403. Responsive information generated by database server 203 is placed on response queue 407, for transmission over the Internet to the requesting client. A response may be information obtained or derived from database 402, or may be an acknowledgment that some message was received or some operation was performed. The dashed arrows in FIG. 4 represent the flow of information among the various software and data components.

Various types of requests may be serviced by server 201, including in particular address translation requests and database update requests. Address translation requests are requests to translate a domain name (or a portion of a domain name) to a set of IP addresses. In the exemplary embodiment described herein, master DNS server 201 is a low-level domain name server which translates the domain name to the specific IP addresses of a destination node. However, a DNS server could also be a higher level domain name server, which translates a portion of a domain name to the address of a lower level DNS server, the lower level DNS serve having more specific information. Database update requests are requests transmitted over the Internet to update one or more records in database 402, as described more fully herein. As shown in FIG. 4, a separate respective function for address translation 404 and database update 405 is included in database server 403. Although database server 403 is shown in FIG. 4 as a single program having multiple included functions, it will be understood that the functions performed by database server 403 may in fact be performed by multiple software modules, and the representation of FIG. 4 is not meant to limit the embodiment of database server functions to any particular structure.

Database maintenance utility 408 provides direct maintenance capability for the database, in accordance with any of various conventional techniques. I.e., maintenance provided by utility 408 is not performed in response to requests received over the Internet, but is performed from terminals or other devices attached to DNS system 201. For example, a systems administrator using a directly attached terminal may manually edit DNS database 402 using utility 408. In addition to manual editing, there may be automated or partially automated maintenance performed by utility 408 or by other devices attached to system 201, such a DHCP server. The use of such a utility provides alternative database maintenance capability for Internet nodes which do not have self-configuring and domain name maintenance capability as described more fully herein, and must therefore use conventional methods for domain name maintenance. It also provides a potentially more secure form of database access for certain types of operations, since directly attached terminals and the like may be kept in a secure environment.

While the software components of FIG. 4 are shown conceptually as residing in memory, it will be understood that in general the memory of a computer system will be too small to hold all programs and data simultaneously, and that information is typically stored in data storage 304, comprising one or more mass storage devices such as rotating magnetic disk drives, and that the information is paged into memory by operating system 401 as required.

Figure 5:
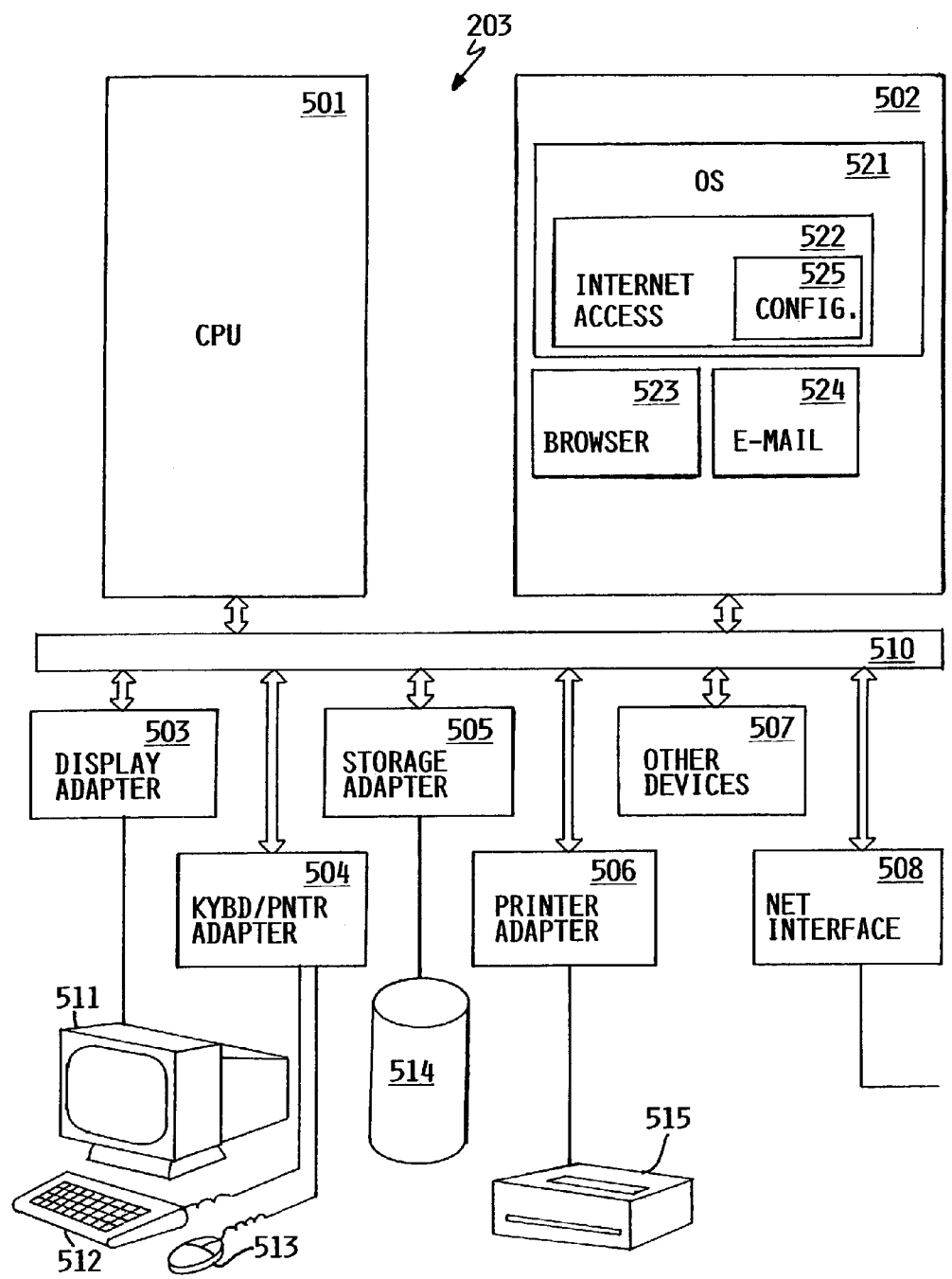
FIG. 5 is a high-level block diagram of the major components of a self-configuring host node, according to the preferred embodiment.

FIG. 5 is a block diagram illustrating the major components of a self-configuring host node 203, according to the preferred embodiment. Host node 203 includes CPU 501, main memory 502, various device adapters and interfaces 503-508, and communications bus 510. CPU 501 is a general-purpose programmable processor, executing instructions stored in memory 502; while a single CPU is shown in FIG. 5, it should be understood that computer systems having multiple CPUs could be used. Memory is a random-access semiconductor memory for storing data and programs; memory is shown conceptually as a single monolithic entity, it being understood that memory is often arranged in a hierarchy of caches and other memory devices. Communications bus 510 supports transfer of data, commands and other information between different devices; while shown in simplified form as a single bus, it may be structured as multiple buses, and may be arranged in a hierarchical form. Display adapter 503 supports video display 511, which is typically a cathode-ray tube display, although other display technologies may be used. Keyboard/pointer adapter 504 supports keyboard 512 and pointing device 513, depicted as a mouse, it being understood that other forms of input devices could be used. Storage adapter 505 supports one or more data storage devices 514, which are typically rotating magnetic hard disk drives, although other data storage devices could be used. Printer adapter 506 supports printer 515. Adapter 507 may support any of a variety of additional devices, such as CD-ROM drives, audio devices, etc. Network interface 508 provides a physical interface to an external network which is ultimately coupled to the Internet. In the exemplary embodiment, network interface 508 is coupled to LAN 204, it being understood that other forms of network connection could be used.

As shown in FIG. 5, operating system 521 and Internet access program 522 reside in memory 502. Operating system 521 provides various low-level software functions, such as device interfaces, management of memory pages, management of multiple tasks, etc. as is well-known in the art. Internet access program 522 is software which communicates through network interface 508 to the Internet. Preferably, internet access program 522 is integrated into the TCP/IP stack within operating system 521. Internet access program 522 includes configuration utility 525 which handles configuration of host node 203 to the various Internet devices, and in particular generates IP addresses for node 203 and updates information in the DNS name server, as more fully described herein. Internet access program 522 generally handles Internet communications on behalf of other applications. Specifically, browser application 523 is a web browser which accesses web servers, renders web pages (e.g., pages in HTML format) into a displayable format for a user, maintains a list of "favorite" URLs, and performs other conventional functions commonly associated with web browsers. E-mail application 524 is an application which sends, receives and displays e-mail and performs other conventional functions commonly associated with e-mail applications. Both browser 523 and e-mail application 524 invoke Internet access program 522 to handle communication of data over the Internet. Although two applications (browser 523 and e-mail 524) which use Internet access program 522 are depicted in FIG. 5, it will be understood that these applications are examples only, and that host 203 could have other or additional applications which use Internet access program 522. It should further be understood that while operating system 521, browser 523 and e-mail application 524 are depicted in FIG. 5 as separate program entities for illustrative purposes, some or all of these programs might be combined in a single program module, or that internet access program 522 and/or configuration utility 525 might be separate modules. Finally, it will be understood that although the software components of FIG. 5 are shown conceptually as residing in memory 502, the memory of a computer system is generally too small to hold all programs and data simultaneously, and that information is typically stored in data storage 514 or similar devices, and paged into memory by operating system 521 as required.

Host node system 203 is shown in FIG. 5 as a single-user desktop computer system of the type known as a "personal computer" or "workstation". The representation of FIG. 5 is intended as an exemplary simplified representation, it being understood that many variations in system configuration are possible in addition to those mentioned here. Furthermore, a host node accessing the Internet in accordance with the present invention need not be a single-user personal computer system, and may be a larger computer system, a notebook or laptop computer. Frequently, such a system will function primarily or exclusively as a server system for responding to requests from remote clients. Finally, such a host node need not be a general-purpose computer system at all, but may be a special-purpose device which accesses the Internet, such as an Internet access box for a television set, or a portable wireless web accessing device.

In accordance with the preferred embodiment of the present invention, a host node attached to the Internet configures itself (either as an original configuration or as a modification of a previous configuration) by automatically generating for itself an Internet address using stateless autoconfiguration, automatically determining the identity of its domain name server, and/or automatically creating or updating a name entry for the host node in the domain name server's database. This process makes it possible to automatically configure a host node for attachment to the Internet with no or minimal manual intervention.

Figure 6:
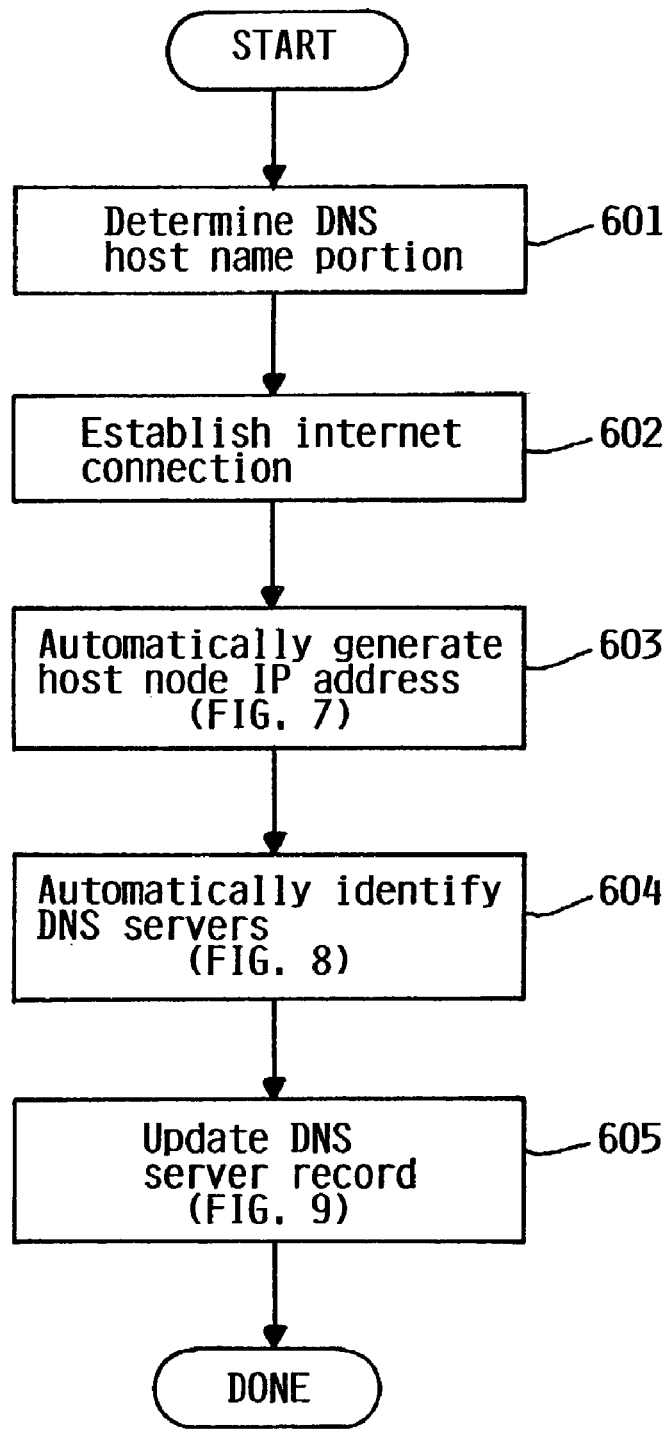
FIG. 6 is a high-level flow diagram of the process of configuring a host node for attachment to the Internet, according to the preferred embodiment.

FIG. 6 is a high-level flow diagram of the process of configuring a host node for attachment to the Internet, according to the preferred embodiment. The same general process may be used for an original configuration of a new host system, for a re-configuration where there has been a change in network topology, or for a configuration change which involves only a change in addresses or names, it being understood that some steps might be modified or omitted, depending on the needs of a particular process.

Referring to FIG. 6, a host portion of a domain name in the DNS naming convention is determined for the host node (step 601). The host portion is that part of the domain name which identifies the host node within the zone of the master domain name server 201 and must necessarily be unique within the zone; it is not necessary to determine the remaining part of the domain name at this stage, since that will be obtained automatically as described herein. The host domain name may be determined in accordance with any of various known conventional methods, or in accordance with any method hereafter developed. Specifically, a domain name may be determined by interactively requesting the user to input a domain name. In the preferred embodiment, configuration utility 525 has the capability to prompt the user to enter a host portion of a domain name if no such name has previously been entered, and to save this data. In the case of a reconfiguration which may, e.g., involve a change of IP address without necessarily changing the domain name, the configuration utility 525 uses the previous domain name. However, the user would have the opportunity to edit the previous domain name, using any conventional editing technique. It would alternatively be possible to obtain a domain name in some other manner. For example, a domain name might be assigned by a company server (not shown) connected to LAN 204; a domain name might be taken from a profile or similar type of file recorded on a diskette, CD-ROM or other computer readable medium; a domain name might be automatically derived according to some pre-established formula from a user's name, company name, department, or other information available to host node 203.

Although step 601 is illustrated in FIG. 6 as being performed before the establishment of the Internet connection and before the generation of the IP address, in fact these steps could take place in a different order, and the designation of a domain name could occur after steps 602, 603 and/or 604.

A communications connection with the Internet is established, using any of various communications technologies and conventions, either now known or hereafter developed (step 602). Typically, this means that host node 203 is physically installed in a desired location and coupled to a communications medium, whereby it may communicate with a router 202 attached to the Internet. In the exemplary embodiment, the host is a desktop workstation having a fixed location and the communications medium is a local area network 204, such as an Ethernet or Token Ring network. However, as explained previously, the host could be a mobile device without a fixed location. Furthermore, other communications media could be used, and the medium need not necessarily be a physical device, but could be a radio frequency or similar broadcast medium. Step 602 is shown in FIG. 6 to illustrate that a connection must be established with the Internet before certain automatic steps can take place. In the case of an original configuration, the installation or a re-configuration involving a change to the Internet connection, step 602 is typically performed shortly before the remaining steps of the configuration process. However, it is possible that step 602 would be performed much earlier, particularly in the case of a configuration change which does not involve a change to a physical connection. For example, where a new user is assigned to a workstation which will not change its physical location, it is possible that a new domain name will be chosen and new IP addresses generated, without change to the hardware connections. In such a case, step 602 may have been performed months or years before the remaining steps of a reconfiguration.

Figure 7:
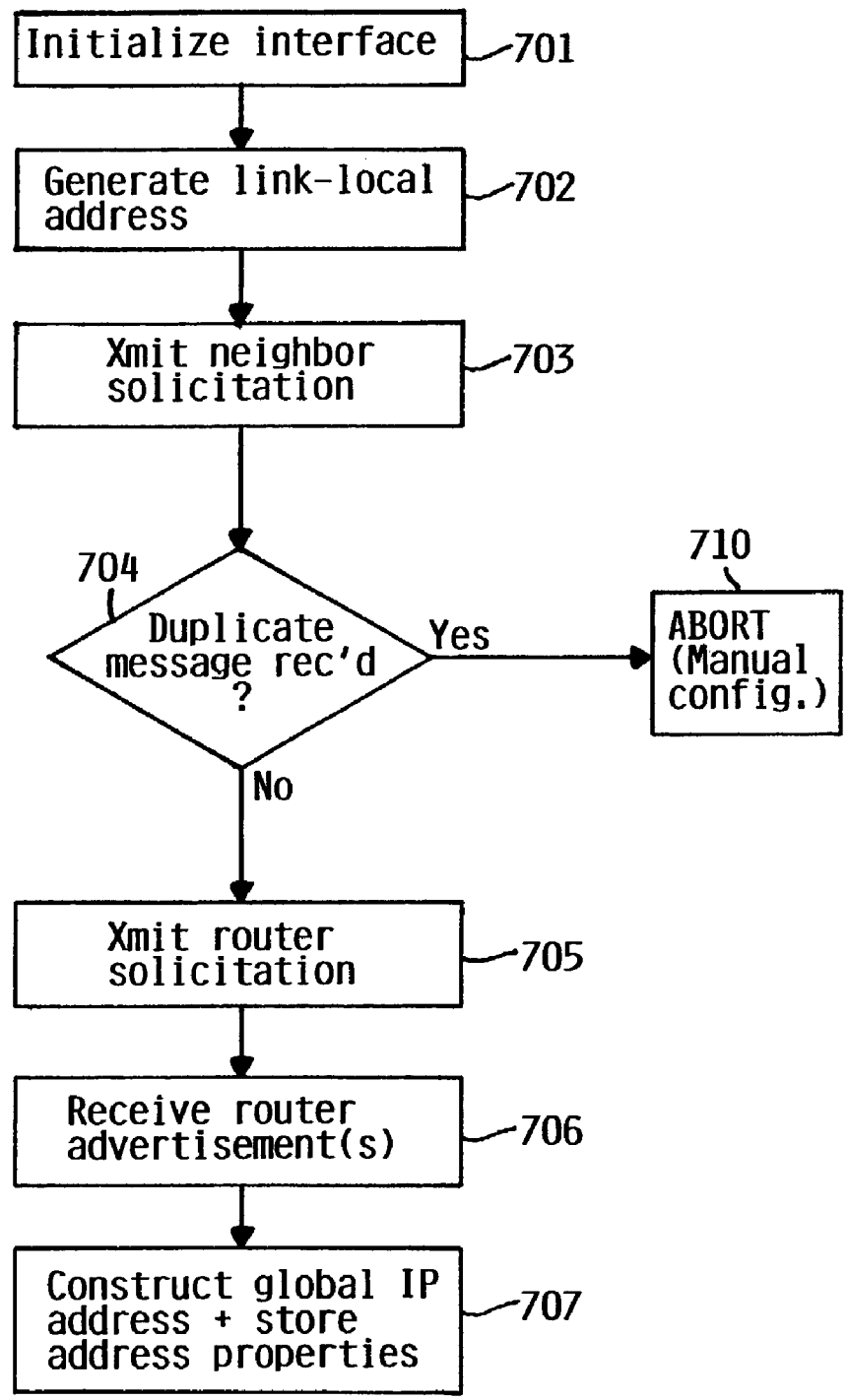
FIG. 7 is a flow diagram showing in greater detail the process of automatically generating an IP address in a host node, according to the preferred embodiment.

Configuration utility 525 executing on host node 203 automatically generates and verifies an IP address for the host node. This process is represented at a high level as step 603 in FIG. 6, and is shown in greater detail in FIG. 7. In general, the procedure of FIG. 7 is consistent with the "IPv6 Stateless Address Autoconfiguration" draft standard Internet Society protocol, described in RFC 2462, by S. Thomson & T. Narten, December 1998, (included in its entirety in Appendix I). Any equivalent procedure or any subsequent modification or revision of this draft standard protocol may alternatively be used.

Referring to FIG. 7, the Internet interface for the host node is initialized or reinitialized (step 701). This may occur in any of several ways, and may occur simultaneously with the establishment of a physical connection (step 601) or may occur subsequently, as when the host system is initialized (started-up), or the interface is logically enabled after having been previously disabled. The host system's configuration utility then automatically generates a link-local address, which may have certain attributes such as lifetime associated with it (step 702). The link-local address is generated by combining a fixed-length pre-determined prefix (such as FE80::0, where the right most bits are zeroes) with an interface address which is peculiar to the form of local connection or link. I.e., in the exemplary embodiment of FIG. 2, the form of an interface address is dictated by the type of LAN 204 to which host node 203 connects. The N-bit interface identifier replaces the N right most zero bits of the pre-determined prefix to create a link-local address of fixed length. An interface identifier may be the same as the interface's link layer address.

The host node then verifies the uniqueness of the link-local address on the local link (e.g., local area network 204). It is necessary that the link-local address be unique within the local link communications mechanism, so that messages within that link are routed to the correct node; however, the link-local address need not be globally unique (unique on the Internet), because a prefix will later be attached to assure global uniqueness. Because the link-local address is derived from the interface address, it is sufficient to verify the uniqueness of the interface address. Uniqueness is verified by transmitting a Neighbor Solicitation on the local link (step 703). The Neighbor Solicitation is a message to all other nodes in the link (e.g., LAN 204), and in this case is used to inform other nodes that the sending host node is attempting to verify the link-local (or interface) address. If a duplicate address is detected, the conflicting node sends a message to the original host node, which is received by the node. If such a message is detected (step 704), the host node knows that the address is not unique, and the address therefore can not be used. In this case, manual configuration is typically necessary (step 710)

If no duplicate address is detected (the "N" branch from step 704), the host node sends a Router Solicitation (step 705). The Router Solicitation is a request that any router on the local link send a Router Advertisement. The host node then receives any Router Advertisements in response (step 706). The Router Advertisement contains information about the router (e.g., router 202), and in particular, contains the router's IP address prefix and the address attribute information. After validity checks, the host node constructs a global IP address using this prefix and the interface address in the same manner as the link-local address was constructed from the fixed link-local prefix (step 707). Attributes may also be derived from interface address attributes and router address attributes. The host node stores the IP address and address attribute (e.g. lifetime) information.

Having generated an IP address, configuration utility 525 then automatically determines the identity of the master DNS server for its zone. This process is represented at a high level as step 604 in FIG. 6, and is shown in greater detail in FIG. 8.

Figure 8:
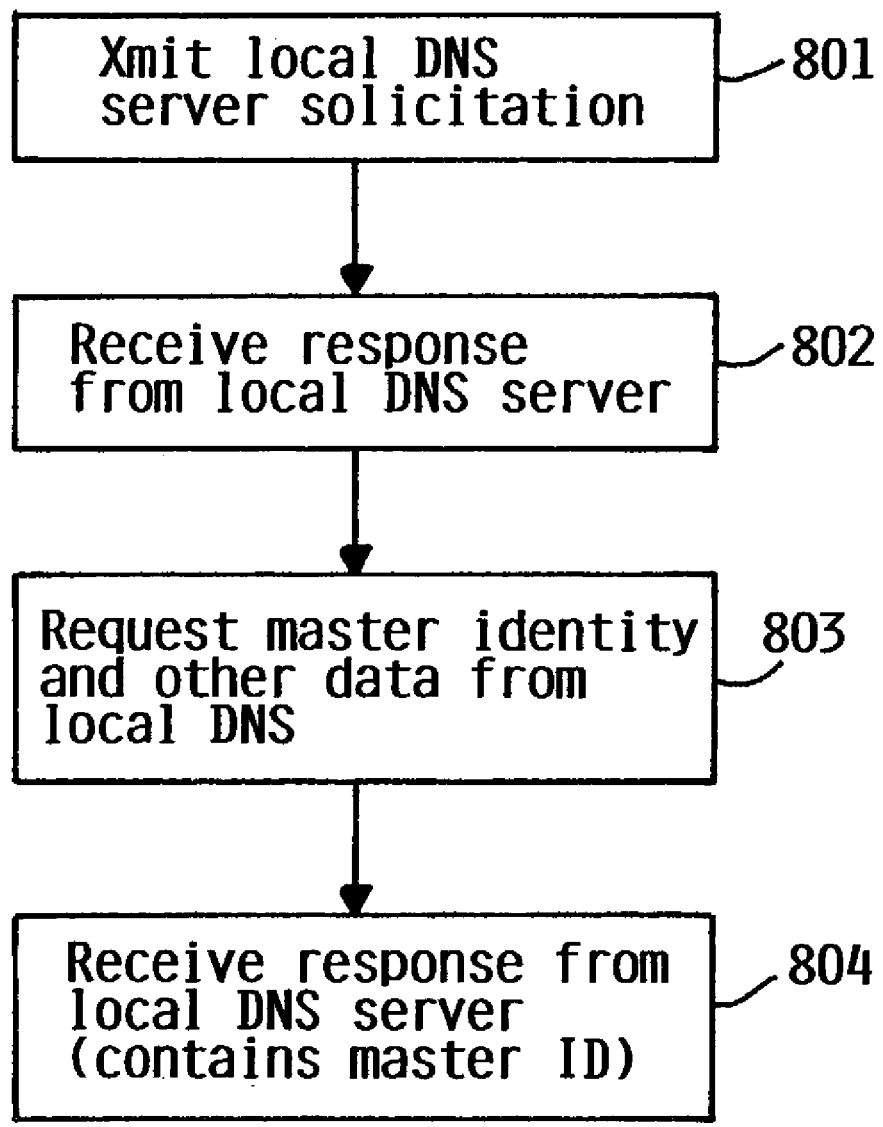
FIG. 8 is a flow diagram showing in greater detail the process of automatically identifying the master domain name server for a host node, according to the preferred embodiment.

Referring to FIG. 8, host node 203 first discovers the identity of the local DNS server 205. To do this, host node 203 formulates and transmits a query to one or more pre-assigned local addresses, which are reserved for use of a local DNS server (step 801). Local DNS server 205 responds with attribute information, including its own address (step 802). In general, steps 801 and 802 are performed consistently with the "IPv6 Stateless DNS Discovery" work in progress, described in Internet-Draft "Ipv6 Stateless DNS Discovery", by D. Thaler & J. Hagino, Mar. 1, 2002, (included in its entirety in Appendix II). Any equivalent procedure or any subsequent modification or revision of this draft protocol may alternatively be used, as well as any equivalent procedure which discovers the local DNS Server. It is noted that the above draft protocol is a work in progress which has expired by its terms and has no authoritative effect, but is included herein as simply one exemplary method (out of possibly many different methods) for discovering the local DNS server.

Having identified local DNS 205, the host then sends another query, requesting local DNS 205 to identify the master DNS 201 of the applicable zone (step 803). The local DNS 205 must maintain this information. The local DNS 205 responds with the identity (i.e., the IP address) of the master DNS (step 804). The local DNS 205 also provides the zone domain name (in the DNS system), i.e., the higher-level portion of the domain name which is common to each node in the zone, and which, when concatenated with a domain name which is unique within the zone, creates a global DNS domain name which is unique on the Internet. Although the query to identify the local DNS and the query to identify the master DNS are shown as two separate steps (801, 803) and two separate responses (802, 804) in FIG. 8, it will be understood that these could be combined, so that the local DNS automatically responds with the identity of the master DNS as well as its own identity in response to the first query.

The request at step 803 and the corresponding response at step 804 may also include security information for communicating with the master DNS server, such as an encryption key, token or similar data. In the preferred embodiment, it is assumed that LAN 204 is a secure network, such as an intra-company network. Hence it is assumed that communications within LAN 204 are safe from snooping from outside the LAN, and that no malicious behavior originates within the LAN itself. Therefore, no particular security precautions are required for communicating between the host node and local DNS server 205. However, communications with the master DNS server go over the Internet and it must be assumed that anyone can listen. Listening to DNS server update requests transmitted over the Internet may allow a malicious device to initiate a so-called denial-of-service attack by pretending to be the host node whose service is being denied, in which DNS records are altered to re-route massages addressed to a particular DNS name to some other address, to delete the DNS name or correct address from the database, or otherwise. For this reason, it may be desirable to use a secure form of communication with the master DNS server, as discussed further herein.

Having identified the master DNS server for the host's zone (as well as the local DNS server, configuration utility 525 then automatically causes the master to update its domain name records relating to the host, and perform certain related functions. This process is represented at a high level as step 605 in FIG. 6, and is shown in greater detail in FIG. 9.

Figure 9:
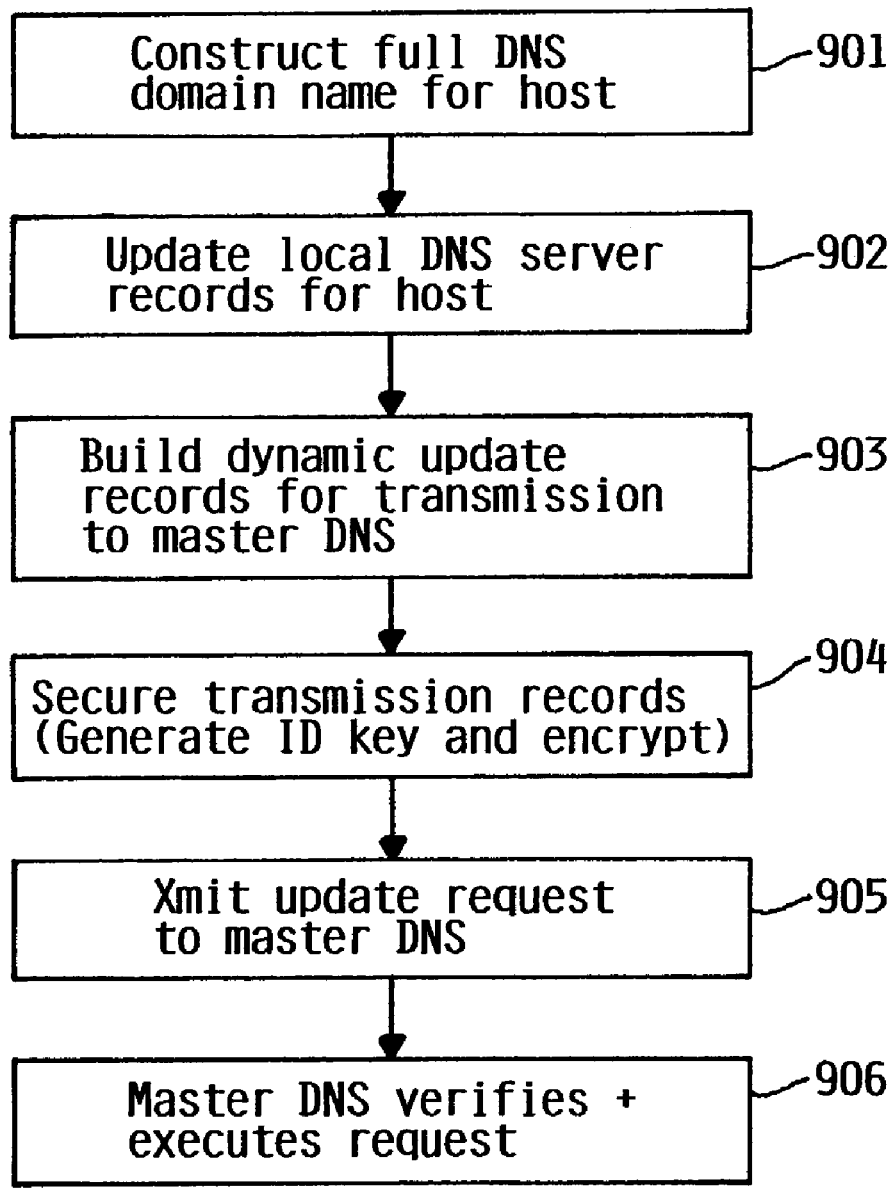
FIG. 9 is a flow diagram showing in greater detail the process of automatically generating and sending the update request to the master domain name server, according to the preferred embodiment.

Referring to FIG. 9, configuration utility 525 constructs the full DNS domain name of the host node with the information now available to it (step 901), i.e., the full DNS domain name is the concatenation of the host name portion determined at step 601 (which should be unique within the zone) and the zone portion (obtained from the local DNS server at step 804).

Host node 203 preferably updates the domain records of local DNS server 205 to store the host's DNS name and link local address (step 902). While step 902 is not necessary to updating the master DNS server records (and for that purpose, step 902 may be considered optional), it is desirable because other nodes on LAN 204 may attempt to communicate with the host node using its DNS name, without its link local address. In this case, local DNS server 205 may provide the link local address of a destination host on LAN 204 to enable such communication, without the need to obtain address translation from other Internet servers (and indeed, in the absence of address translation from other Internet servers). Any pre-established protocol may be used for communicating the necessary update information from the host to the local DNS server. In particular, it would be possible to use the same protocols as used to communicated with the master DNS server, although typically encryption or similar security measures may be considered unnecessary in communicating with the local DNS. The local DNS assumes that any update request originating within LAN 204 is proper, and will comply with it.

Host node 203 then builds dynamic update records for transmission to the master DNS server using the information now available to it (step 903). Specifically, host node now has its own full DNS domain name (derived as explained in step 901), its own full global IP address (derived in step 707), relevant attributes of the address, such as lifetime (either received from the router at step 706 or inherent in the interface address when it was generated at step 702), address of the master DNS server (obtained at step 804), and security data for communicating with the master DNS server (obtained at step 804)

Master DNS server 201 is preferably a server which responds not only to requests to translate DNS addresses, but also to requests to update its DNS database 402. These database update requests are received over the Internet through unsecure channels. If the DNS server simply performed all requests received without verification, malicious host devices could alter the records in DNS database 402 to disrupt the flow of information on the Internet and deny service to other hosts. In the preferred embodiment, master DNS server 201 operates on the principle that any requesting device may create a DNS name record for a new DNS name, provided it is consistent with conventional naming rules. However, once created, only the original requesting device, or certain authorized and trusted devices which may be used for Internet administration, are allowed to update the DNS name record.

The problem of securing update requests therefore becomes one of (a) verifying that a DNS name update request comes from the original requesting device; and (b) hiding the communication from other devices on the Internet to prevent another device from copying the identifying information and pretending to be the original requesting device. Securing the communication is depicted in FIG. 9 as step 904, and described in greater detail below.

Hiding the DNS update communication can be accomplished using any of various encryption techniques. Preferably, a public/private key encryption technique is used. The local DNS server provides the host with the public key of the master DNS server. Local host uses this key to encrypt at least part of the request, and the master DNS server decrypts the request with its private key, which is not available to other devices.

Verifying the identity of the requester may be accomplished as follows, it being understood that many possible variations of a verification technique as described herein could be used. Host node 203 generates its own identity key, preferably as a random number of sufficient length, although this could be a random number in combination with some other number, such as a machine serial number or the like. (A random number need not be guaranteed unique in the mathematical sense, but a sufficiently long random number makes accidental duplication extremely unlikely, and may thus be considered unique for all practical purposes). In the original request for a new DNS domain name, the requesting host device includes its identity key. The requesting host also includes a time/date stamp, and of course, the data required for creating a new record. The entire request may be encrypted using the master DNS server's public key, or it may be possible to encrypt only a "signature", which would include the identity key, the time/date stamp, and some data from the request (such as a hash of the record). It is not sufficient to encrypt only the identity key, because the encrypted key could then simply be copied. Upon receipt, the DNS server decrypts all encrypted information and verifies the key. The DNS server also checks the date/time stamp (if it is too stale, it should be rejected). In the case of a new DNS name (one which is not in the database), the key is simply assumed valid, but the same key must be used for all subsequent requests. In this case, the DNS server creates the new record, and stores the identity key with the record. Any subsequent request to update the record (i.e., a subsequent request relating to the same DNS domain name, such as adding an IP address to a list of addresses associated with the DNS domain name) received from a host other than one of the few trusted hosts must contain the same identity key, and if not, the request is not honored. Therefore, when host 203 generates its identity key, it must save the key for subsequent DNS update requests.

Since the devices on LAN 204 are trusted by local DNS server 205, it would alternatively be possible for local DNS server 205 to generate an identity key which is used by all devices on LAN 204, and to transmit this key to host node 203 for use in its request.

Host node then transmits the update request to the master DNS server (step 905). Master DNS server decrypts the request, verifies the request as described above, and performs the appropriate update of the database (step 906). I.e., in the case of a new domain name (one which is not in the database), the master DNS server generates a new domain name record in the database, associating the domain name with the IP address contained in the request, and storing any additional parameters required. In the case of an existing domain name, the IP address in the request is associated with the existing domain name record in the database, and any additional required parameters are stored.

The protocols used for updating database records may follow those used generally by DHCP servers, which define the type of information transmitted and so forth. The known BIND 8 protocol, or its more recent version, BIND 9 (or any subsequent update of this protocol) may be used. Alternatively, any protocol which provides the necessary information for updates could be used. By way of example and not limitation, such a protocol is described in "Dynamic Updates in the Domain Name System (DNS Update)" draft standard Internet Society protocol, RFC 2136, by P. Vixie, S. Thomson, Y. Rekhter & J. Bound, December 1997, herein incorporated by reference.

In the description above, it is assumed for clarity of understanding that a single master DNS server 201 maintains the domain name records for the applicable zone which includes the host, and with which the host communicates to update the records. However, the master DNS server for a zone need not conform to any particular configuration. It is possibly a single system, or multiple systems. If multiple systems, such systems may be dissimilar, may have multiple addresses, and/or may have multiple copies of the domain name records (and a process for synchronizing the copies). As used herein and in the claims, a "master domain name server" or "master DNS server" should be understood to include any system or conglomeration of systems which authoritatively maintains domain name records for the applicable zone.

It will be understood that certain modifications to conventional host and DNS server behavior required to support the present invention as described in the preferred embodiment herein are not necessarily required under any existing Internet standard, although they are not inconsistent with those standards. Some of these modifications (or modifications of a similar nature) are envisioned in the various draft standards mentioned herein, while others are extensions to existing standards or draft standards. However, it is not necessary to adopt a new Internet standard and implement it on all devices connected to the Internet in order to practice the present invention as described herein. If, for example, all local devices (on LAN 204) adhere to the behavior described herein, it is possible for a host node to automatically generate its address, determine its router, find its local and master DNS servers, and send an update request to the master DNS server. In fact, if there is sufficient confidence in the integrity of the LAN and its attached devices, it is not strictly necessary for all local devices to follow the protocols described for verifying the link-local address of the host node, and only the host node being configured and the local DNS server require modification to support the techniques described herein.

It will be understood that disclosed herein is a preferred embodiment of a technique for automatically maintaining DNS data, and that many variations in addition to those specifically discussed herein are possible in the method steps shown in FIGS. 6-9 and described above. Specifically, it will be recognized that the order of performing certain steps may be changed, that some steps may be optional or may be performed in a different manner from that described herein, that some steps may be combined, and so forth. In particular, the order of performing steps illustrated in FIGS. 6-9 is typical of that for a newly connected Internet device, which must acquire all the needed information (although even in the case of a newly connected device, some variation in the order to certain steps may occur). Where an existing host node is simply updating some of its configuration information, as by generating a new IP address, the order of performing steps will typically be significantly different, e.g., the determination of routers, DNS name servers, and full DNS domain name, may have occurred months or years before the new IP address is generated, the required information having been saved in the host node during the intervening time.

It will be recognized that in some configurations, there will be no local DNS server 205 on the same local link 204, the devices on this local link accessing a DNS server through router 202. However, there should be some relatively local DNS server which is intended for use by devices attached to router 202 as an initial address for decoding Internet domain names.

In the preferred embodiment, the identity of the applicable master domain name server is discovered by first discovering a local domain name server, and then obtaining the identity from the local server. However, it will be recognized that alternative methods of determining the identity of the master domain name server may be used. Such methods need not necessarily depend on the existence or assistance of a local domain name server on the same local link as the host node. For example, the router may be configured to store the IP address of either the master DNS server or a relatively local DNS server, and to transmit this data as part of the router advertisement, although this would presumably require a modification to the existing router protocols. Alternatively, this data may be part of a profile data file which is loaded onto the host machine when it is initially configured. Furthermore, other or alternative protocols may be developed in the future for discovering this information.

In the preferred embodiment, a draft standard relating to stateless autoconfiguration is used to generate the IP address of the host node, wherein the host generates its own link-local address and obtains the global portion of the IP address from the router. However, it will be understood that alternative procedures could be used, and since the stateless autoconfiguration is only a draft, one may expect that modification may occur to the standard before it is final. Additionally, one needn't follow any recognized standard protocol to generate an IP address in accordance with the present invention.

In general, the routines executed to implement the illustrated embodiments of the invention, whether implemented as part of an operating system or a specific application, program, object, module or sequence of instructions are referred to herein as "computer programs". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. An example of signal-bearing media is illustrated in FIG. 3 as memory 302 and data storage device 304, and in FIG. 5 as memory 502 and storage 514.

Although a specific embodiment of the invention has been disclosed along with certain alternatives, it will be recognized by those skilled in the art that additional variations in form and detail may be made within the scope of the claims which follow the Appendices herein.

APPENDIX I

IPv6 Stateless Address Autoconfiguration Draft Standard RFC2462

| Network Working Group | S. Thomson |
|---|---|
| Request for Comments: 2462 | Bellcore |
| Obsoletes: 1971 | T. Narten |
| Category: Standards Track | IBM |
| | December 1998 |

IPv6 Stateless Address Autoconfiguration

Status of this Memo

This document specifies an Internet standards track protocol for the Internet community, and requests discussion and suggestions for improvements. Please refer to the current edition of the "Internet Official Protocol Standards" (STD 1) for the standardization state and status of this protocol. Distribution of this memo is unlimited.

Copyright Notice

Copyright (C) The Internet Society (1998). All Rights Reserved.

Abstract

This document specifies the steps a host takes in deciding how to autoconfigure its interfaces in IP version 6. The autoconfiguration process includes creating a link-local address and verifying its uniqueness on a link, determining what information should be configured (address, other information, or both), and in the case of addresses, whether they should be obtained through the stateless mechanism, the stateful mechanism, or both. This document defines the process for generating a link-local address, the process for generating site-local and global addresses via stateless address autoconfiguration, and the Duplicate Address Detection procedure. The details of autoconfiguration using the stateful protocol are specified elsewhere.

| Table of Contents | |
|---|---|
| 1. INTRODUCTION | [Pagination deleted] |
| 2. TERMINOLOGY | |
|     2.1. Requirements | |
| 3. DESIGN GOALS | |
| 4. PROTOCOL OVERVIEW | |
|     4.1. Site Renumbering | |
| 5. PROTOCOL SPECIFICATION | |
|     5.1. Node Configuration Variables | |
|     5.2. Autoconfiguration-Related Variables | |
|     5.3. Creation of Link-Local Addresses | |
|     5.4. Duplicate Address Detection | |
|         5.4.1. Message Validation | |
|         5.4.2. Sending Neighbor Solicitation Messages | |
|         5.4.3. Receiving Neighbor Solicitation Messages | |
|         5.4.4. Receiving Neighbor Advertisement Messages | |
|         5.4.5. When Duplicate Address Detection Fails | |
|     5.5. Creation of Global and Site-Local Addresses | |
|         5.5.1. Soliciting Router Advertisements | |
|         5.5.2. Absence of Router Advertisements | |
|         5.5.3. Router Advertisement Processing | |
|         5.5.4. Address Lifetime Expiry | |
|     5.6. Configuration Consistency | |
| 6. SECURITY CONSIDERATIONS | |
| 7. References | |
| 8. Acknowledgements and Authors' Addresses | |
| 9. APPENDIX A: LOOPBACK SUPPRESSION & DUPLICATE ADDRESS DETECTION | |
| 10. APPENDIX B: CHANGES SINCE RFC 1971 | |
| 11. Full Copyright Statement | |

1. INTRODUCTION

This document specifies the steps a host takes in deciding how to autoconfigure its interfaces in IP version 6. The autoconfiguration process includes creating a link-local address and verifying its uniqueness on a link, determining what information should be autoconfigured (addresses, other information, or both), and in the case of addresses, whether they should be obtained through the stateless mechanism, the stateful mechanism, or both. This document defines the process for generating a link-local address, the process for generating site-local and global addresses via stateless address autoconfiguration, and the Duplicate Address Detection procedure. The details of autoconfiguration using the stateful protocol are specified elsewhere.

IPv6 defines both a stateful and stateless address autoconfiguration mechanism. Stateless autoconfiguration requires no manual configuration of hosts, minimal (if any) configuration of routers, and no additional servers. The stateless mechanism allows a host to generate its own addresses using a combination of locally available information and information advertised by routers. Routers advertise prefixes that identify the subnet(s) associated with a link, while hosts generate an "interface identifier" that uniquely identifies an interface on a subnet. An address is formed by combining the two. In the absence of routers, a host can only generate link-local addresses. However, link-local addresses are sufficient for allowing communication among nodes attached to the same link.

In the stateful autoconfiguration model, hosts obtain interface addresses and/or configuration information and parameters from a server. Servers maintain a database that keeps track of which addresses have been assigned to which hosts. The stateful autoconfiguration protocol allows hosts to obtain addresses, other configuration information or both from a server. Stateless and stateful autoconfiguration complement each other. For example, a host can use stateless autoconfiguration to configure its own addresses, but use stateful autoconfiguration to obtain other information. Stateful autoconfiguration for IPv6 is the subject of future work [DHCPv6].

The stateless approach is used when a site is not particularly concerned with the exact addresses hosts use, so long as they are unique and properly routable. The stateful approach is used when a site requires tighter control over exact address assignments. Both stateful and stateless address autoconfiguration may be used simultaneously. The site administrator specifies which type of autoconfiguration to use through the setting of appropriate fields in Router Advertisement messages [DISCOVERY].

IPv6 addresses are leased to an interface for a fixed (possibly infinite) length of time. Each address has an associated lifetime that indicates how long the address is bound to an interface. When a lifetime expires, the binding (and address) become invalid and the address may be reassigned to another interface elsewhere in the Internet. To handle the expiration of address bindings gracefully, an address goes through two distinct phases while assigned to an interface. Initially, an address is "preferred", meaning that its use in arbitrary communication is unrestricted. Later, an address becomes "deprecated" in anticipation that its current interface binding will become invalid. While in a deprecated state, the use of an address is discouraged, but not strictly forbidden. New communication (e.g., the opening of a new TCP connection) should use a preferred address when possible. A deprecated address should be used only by applications that have been using it and would have difficulty switching to another address without a service disruption.

To insure that all configured addresses are likely to be unique on a given link, nodes run a "duplicate address detection" algorithm on addresses before assigning them to an interface. The Duplicate Address Detection algorithm is performed on all addresses, independent of whether they are obtained via stateless or stateful autoconfiguration. This document defines the Duplicate Address Detection algorithm.

The autoconfiguration process specified in this document applies only to hosts and not routers. Since host autoconfiguration uses information advertised by routers, routers will need to be configured by some other means. However, it is expected that routers will generate link-local addresses using the mechanism described in this document. In addition, routers are expected to successfully pass the Duplicate Address Detection procedure described in this document on all addresses prior to assigning them to an interface.

Section 2 provides definitions for terminology used throughout this document. Section 3 describes the design goals that lead to the current autoconfiguration procedure. Section 4 provides an overview of the protocol, while Section 5 describes the protocol in detail.

2. TERMINOLOGY

IP—Internet Protocol Version 6. The terms IPv4 and are used only in contexts where necessary to avoid ambiguity.

node—a device that implements IP.

router—a node that forwards IP packets not explicitly addressed to itself.

host—any node that is not a router.

upper layer—a protocol layer immediately above IP. Examples are transport protocols such as TCP and UDP, control protocols such as ICMP, routing protocols such as OSPF, and internet or lower-layer protocols being "tunneled" over (i.e., encapsulated in) IP such as IPX, AppleTalk, or IP itself.

link—a communication facility or medium over which nodes can communicate at the link layer, i.e., the layer immediately below IP. Examples are Ethernets (simple or bridged); PPP links; X.25, Frame Relay, or ATM networks; and internet (or higher) layer "tunnels", such as tunnels over IPv4 or IPv6 itself.

interface—a node's attachment to a link.

packet—an IP header plus payload.

address—an IP-layer identifier for an interface or a set of interfaces.

unicast address—an identifier for a single interface. A packet sent to a unicast address is delivered to the interface identified by that address.

multicast address—an identifier for a set of interfaces (typically belonging to different nodes). A packet sent to a multicast address is delivered to all interfaces identified by that address.

anycast address—an identifier for a set of interfaces (typically belonging to different nodes). A packet sent to an anycast address is delivered to one of the interfaces identified by that address (the "nearest" one, according to the routing protocol's measure of distance). See [ADDR-ARCH].

solicited-node multicast address—a multicast address to which Neighbor Solicitation messages are sent. The algorithm for computing the address is given in [DISCOVERY].

link-layer address—a link-layer identifier for an interface. Examples include IEEE 802 addresses for Ethernet links and E.164 addresses for ISDN links.

link-local address—an address having link-only scope that can be used to reach neighboring nodes attached to the same link. All interfaces have a link-local unicast address.

site-local address—an address having scope that is limited to the local site.

global address—an address with unlimited scope.

communication—any packet exchange among nodes that requires that the address of each node used in the exchange remain the same for the duration of the packet exchange. Examples are a TCP connection or a UDP request-response.

tentative address—an address whose uniqueness on a link is being verified, prior to its assignment to an interface. A tentative address is not considered assigned to an interface in the usual sense. An interface discards received packets addressed to a tentative address, but accepts Neighbor Discovery packets related to Duplicate Address Detection for the tentative address.

preferred address—an address assigned to an interface whose use by upper layer protocols is unrestricted. Preferred addresses may be used as the source (or destination) address of packets sent from (or to) the interface.

deprecated address—An address assigned to an interface whose use is discouraged, but not forbidden. A deprecated address should no longer be used as a source address in new communications, but packets sent from or to deprecated addresses are delivered as expected. A deprecated address may continue to be used as a source address in communications where switching to a preferred address causes hardship to a specific upper-layer activity (e.g., an existing TCP connection).

valid address—a preferred or deprecated address. A valid address may appear as the source or destination address of a packet, and the internet routing system is expected to deliver packets sent to a valid address to their intended recipients.

invalid address—an address that is not assigned to any interface. A valid address becomes invalid when its valid lifetime expires. Invalid addresses should not appear as the destination or source address of a packet. In the former case, the internet routing system will be unable to deliver the packet, in the later case the recipient of the packet will be unable to respond to it.

preferred lifetime—the length of time that a valid address is preferred (i.e., the time until deprecation). When the preferred lifetime expires, the address becomes deprecated.

valid lifetime—the length of time an address remains in the valid state (i.e., the time until invalidation). The valid lifetime must be greater then or equal to the preferred lifetime. When the valid lifetime expires, the address becomes invalid.

interface identifier—a link-dependent identifier for an interface that is (at least) unique per link [ADDR-ARCH]. Stateless address autoconfiguration combines an interface identifier with a prefix to form an address. From address autoconfiguration's perspective, an interface identifier is a bit string of known length. The exact length of an interface identifier and the way it is created is defined in a separate link-type specific document that covers issues related to the transmission of IP over a particular link type (e.g., [IPv6-ETHER]). In many cases, the identifier will be the same as the interface's link-layer address.

2.1. Requirements

The keywords MUST, MUST NOT, REQUIRED, SHALL, SHALL NOT, SHOULD, SHOULD NOT, RECOMMENDED, MAY, and OPTIONAL, when they appear in this document, are to be interpreted as described in [KEYWORDS].

3. DESIGN GOALS

Stateless autoconfiguration is designed with the following goals in mind:

Manual configuration of individual machines before connecting them to the network should not be required. Consequently, a mechanism is needed that allows a host to obtain or create unique addresses for each of its interfaces. Address autoconfiguration assumes that each interface can provide a unique identifier for that interface (i.e., an "interface identifier"). In the simplest case, an interface identifier consists of the interface's link-layer address. An interface identifier can be combined with a prefix to form an address.

Small sites consisting of a set of machines attached to a single link should not require the presence of a stateful server or router as a prerequisite for communicating. Plug-and-play communication is achieved through the use of link-local addresses. Link-local addresses have a well-known prefix that identifies the (single) shared link to which a set of nodes attach. A host forms a link-local address by appending its interface identifier to the link-local prefix.

A large site with multiple networks and routers should not require the presence of a stateful address configuration server. In order to generate site-local or global addresses, hosts must determine the prefixes that identify the subnets to which they attach. Routers generate periodic Router Advertisements that include options listing the set of active prefixes on a link.

Address configuration should facilitate the graceful renumbering of a site's machines. For example, a site may wish to renumber all of its nodes when it switches to a new network service provider. Renumbering is achieved through the leasing of addresses to interfaces and the assignment of multiple addresses to the same interface. Lease lifetimes provide the mechanism through which a site phases out old prefixes. The assignment of multiple addresses to an interface provides for a transition period during which both a new address and the one being phased out work simultaneously.

System administrators need the ability to specify whether stateless autoconfiguration, stateful autoconfiguration, or both should be used. Router Advertisements include flags specifying which mechanisms a host should use.

4. PROTOCOL OVERVIEW

This section provides an overview of the typical steps that take place when an interface autoconfigures itself. Autoconfiguration is performed only on multicast-capable links and begins when a multicast-capable interface is enabled, e.g., during system startup. Nodes (both hosts and routers) begin the autoconfiguration process by generating a link-local address for the interface. A link-local address is formed by appending the interface's identifier to the well-known link-local prefix.

Before the link-local address can be assigned to an interface and used, however, a node must attempt to verify that this "tentative" address is not already in use by another node on the link. Specifically, it sends a Neighbor Solicitation message containing the tentative address as the target. If another node is already using that address, it will return a Neighbor Advertisement saying so. If another node is also attempting to use the same address, it will send a Neighbor Solicitation for the target as well. The exact number of times the Neighbor Solicitation is (re)transmitted and the delay time between consecutive solicitations is link-specific and may be set by system management.

If a node determines that its tentative link-local address is not unique, autoconfiguration stops and manual configuration of the interface is required. To simplify recovery in this case, it should be possible for an administrator to supply an alternate interface identifier that overrides the default identifier in such a way that the autoconfiguration mechanism can then be applied using the new (presumably unique) interface identifier. Alternatively, link-local and other addresses will need to be configured manually.

Once a node ascertains that its tentative link-local address is unique, it assigns it to the interface. At this point, the node has IP-level connectivity with neighboring nodes. The remaining autoconfiguration steps are performed only by hosts; the (auto)configuration of routers is beyond the scope of this document.

The next phase of autoconfiguration involves obtaining a Router Advertisement or determining that no routers are present. If routers are present, they will send Router Advertisements that specify what sort of autoconfiguration a host should do. If no routers are present, stateful autoconfiguration should be invoked.

Routers send Router Advertisements periodically, but the delay between successive advertisements will generally be longer than a host performing autoconfiguration will want to wait [DISCOVERY]. To obtain an advertisement quickly, a host sends one or more Router Solicitations to the all-routers multicast group. Router Advertisements contain two flags indicating what type of stateful autoconfiguration (if any) should be performed. A "managed address configuration" flag indicates whether hosts should use stateful autoconfiguration to obtain addresses. An "other stateful configuration" flag indicates whether hosts should use stateful autoconfiguration to obtain additional information (excluding addresses).

Router Advertisements also contain zero or more Prefix Information options that contain information used by stateless address autoconfiguration to generate site-local and global addresses. It should be noted that the stateless and stateful address autoconfiguration fields in Router Advertisements are processed independently of one another, and a host may use both stateful and stateless address autoconfiguration simultaneously. One Prefix Information option field, the "autonomous address-configuration flag", indicates whether or not the option even applies to stateless autoconfiguration. If it does, additional option fields contain a subnet prefix together with lifetime values indicating how long addresses created from the prefix remain preferred and valid.

Because routers generate Router Advertisements periodically, hosts will continually receive new advertisements. Hosts process the information contained in each advertisement as described above, adding to and refreshing information received in previous advertisements.

For safety, all addresses must be tested for uniqueness prior to their assignment to an interface. In the case of addresses created through stateless autoconfig, however, the uniqueness of an address is determined primarily by the portion of the address formed from an interface identifier. Thus, if a node has already verified the uniqueness of a link-local address, additional addresses created from the same interface identifier need not be tested individually. In contrast, all addresses obtained manually or via stateful address autoconfiguration should be tested for uniqueness individually. To accommodate sites that believe the overhead of performing Duplicate Address Detection outweighs its benefits, the use of Duplicate Address Detection can be disabled through the administrative setting of a per-interface configuration flag.

To speed the autoconfiguration process, a host may generate its link-local address (and verify its uniqueness) in parallel with waiting for a Router Advertisement. Because a router may delay responding to a Router Solicitation for a few seconds, the total time needed to complete autoconfiguration can be significantly longer if the two steps are done serially.

4.1. Site Renumbering

Address leasing facilitates site renumbering by providing a mechanism to time-out addresses assigned to interfaces in hosts. At present, upper layer protocols such as TCP provide no support for changing end-point addresses while a connection is open. If an end-point address becomes invalid, existing connections break and all communication to the invalid address fails. Even when applications use UDP as a transport protocol, addresses must generally remain the same during a packet exchange.

Dividing valid addresses into preferred and deprecated categories provides a way of indicating to upper layers that a valid address may become invalid shortly and that future communication using the address will fail, should the address's valid lifetime expire before communication ends. To avoid this scenario, higher layers should use a preferred address (assuming one of sufficient scope exists) to increase the likelihood that an address will remain valid for the duration of the communication. It is up to system administrators to set appropriate prefix lifetimes in order to minimize the impact of failed communication when renumbering takes place. The deprecation period should be long enough that most, if not all, communications are using the new address at the time an address becomes invalid.

The IP layer is expected to provide a means for upper layers (including applications) to select the most appropriate source address given a particular destination and possibly other constraints. An application may choose to select the source address itself before starting a new communication or may leave the address unspecified, in which case the upper networking layers will use the mechanism provided by the IP layer to choose a suitable address on the application's behalf.

Detailed address selection rules are beyond the scope of this document.

5. PROTOCOL SPECIFICATION

Autoconfiguration is performed on a per-interface basis on multicast-capable interfaces. For multihomed hosts, autoconfiguration is performed independently on each interface. Autoconfiguration applies primarily to hosts, with two exceptions. Routers are expected to generate a link-local address using the procedure outlined below. In addition, routers perform Duplicate Address Detection on all addresses prior to assigning them to an interface.

5.1. Node Configuration Variables

A node MUST allow the following autoconfiguration-related variable to be configured by system management for each multicast interface:

DupAddrDetectTransmits
  The number of consecutive Neighbor Solicitation messages sent while performing Duplicate Address Detection on a tentative address. A value of zero indicates that Duplicate Address Detection is not performed on tentative addresses. A value of one indicates a single transmission with no follow up retransmissions.
  Default: 1, but may be overridden by a link-type specific value in the document that covers issues related to the transmission of IP over a particular link type (e.g., [IPv6-ETHER]).
  Autoconfiguration also assumes the presence of the variable RetransTimer as defined in [DISCOVERY]. For autoconfiguration purposes, RetransTimer specifies the delay between consecutive Neighbor Solicitation transmissions performed during Duplicate Address Detection (if DupAddrDetectTransmits is greater than 1), as well as the time a node waits after sending the last Neighbor Solicitation before ending the Duplicate Address Detection process.

5.2. Autoconfiguration-Related Variables

A host maintains a number of data structures and flags related to autoconfiguration. In the following, we present conceptual variables and show how they are used to perform autoconfiguration. The specific variables are used for demonstration purposes only, and an implementation is not required to have them, so long as its external behavior is consistent with that described in this document.

Beyond the formation of a link-local address and using Duplicate Address Detection, how routers (auto)configure their interfaces is beyond the scope of this document.

Hosts maintain the following variables on a per-interface basis:

ManagedFlag Copied from the M flag field (i.e., the "managed address configuration" flag) of the most recently received Router Advertisement message. The flag indicates whether or not addresses are to be configured using the stateful autoconfiguration mechanism. It starts out in a FALSE state.

OtherConfigFlag Copied from the O flag field (i.e., the "other stateful configuration" flag) of the most recently received Router Advertisement message. The flag indicates whether or not information other than addresses is to be obtained using the stateful autoconfiguration mechanism. It starts out in a FALSE state. In addition, when the value of the ManagedFlag is TRUE, the value of OtherConfigFlag is implicitly TRUE as well. It is not a valid configuration for a host to use stateful address autoconfiguration to request addresses only, without also accepting other configuration information.

A host also maintains a list of addresses together with their corresponding lifetimes. The address list contains both auto-configured addresses and those configured manually.

5.3. Creation of Link-Local Addresses

A node forms a link-local address whenever an interface becomes enabled. An interface may become enabled after any of the following events:

The interface is initialized at system startup time.
The interface is reinitialized after a temporary interface failure or after being temporarily disabled by system management.
The interface attaches to a link for the first time.
The interface becomes enabled by system management after having been administratively disabled.

A link-local address is formed by prepending the well-known link-local prefix FE80::0 [ADDR-ARCH] (of appropriate length) to the interface identifier. If the interface identifier has a length of N bits, the interface identifier replaces the right-most N zero bits of the link-local prefix. If the interface identifier is more than 118 bits in length, autoconfiguration fails and manual configuration is required. Note that interface identifiers will typically be 64-bits long and based on EUI-64 identifiers as described in [ADDR-ARCH].

A link-local address has an infinite preferred and valid lifetime; it is never timed out.

5.4. Duplicate Address Detection

Duplicate Address Detection is performed on unicast addresses prior to assigning them to an interface whose DupAddrDetectTransmits variable is greater than zero. Duplicate Address Detection MUST take place on all unicast addresses, regardless of whether they are obtained through stateful, stateless or manual configuration, with the exception of the following cases:

Duplicate Address Detection MUST NOT be performed on anycast addresses.
Each individual unicast address SHOULD be tested for uniqueness. However, when stateless address autoconfiguration is used, address uniqueness is determined solely by the interface identifier, assuming that subnet prefixes are assigned correctly (i.e., if all of an interface's addresses are generated from the same identifier, either all addresses or none of them will be duplicates). Thus, for a set of addresses formed from the same interface identifier, it is sufficient to check that the link-local address generated from the identifier is unique on the link. In such cases, the link-local address MUST be tested for uniqueness, and if no duplicate address is detected, an implementation MAY choose to skip Duplicate Address Detection for additional addresses derived from the same interface identifier.

The procedure for detecting duplicate addresses uses Neighbor Solicitation and Advertisement messages as described below. If a duplicate address is discovered during the procedure, the address cannot be assigned to the interface. If the address is derived from an interface identifier, a new identifier will need to be assigned to the interface, or all IP addresses for the interface will need to be manually configured. Note that the method for detecting duplicates is not completely reliable, and it is possible that duplicate addresses will still exist (e.g., if the link was partitioned while Duplicate Address Detection was performed).

An address on which the duplicate Address Detection Procedure is applied is said to be tentative until the procedure has completed successfully. A tentative address is not considered "assigned to an interface" in the traditional sense. That is, the interface must accept Neighbor Solicitation and Advertisement messages containing the tentative address in the Target Address field, but processes such packets differently from those whose Target Address matches an address assigned to the interface. Other packets addressed to the tentative address should be silently discarded.

It should also be noted that Duplicate Address Detection must be performed prior to assigning an address to an interface in order to prevent multiple nodes from using the same address simultaneously. If a node begins using an address in parallel with Duplicate Address Detection, and another node is already using the address, the node performing Duplicate Address Detection will erroneously process traffic intended for the other node, resulting in such possible negative consequences as the resetting of open TCP connections.

The following subsections describe specific tests a node performs to verify an address's uniqueness. An address is considered unique if none of the tests indicate the presence of a duplicate address within RetransTimer milliseconds after having sent DupAddrDetectTransmits Neighbor Solicitations. Once an address is determined to be unique, it may be assigned to an interface.

5.4.1. Message Validation

A node MUST silently discard any Neighbor Solicitation or Advertisement message that does not pass the validity checks specified in [DISCOVERY]. A solicitation that passes these validity checks is called a valid solicitation or valid advertisement.

5.4.2. Sending Neighbor Solicitation Messages

Before sending a Neighbor Solicitation, an interface MUST join the all-nodes multicast address and the solicited-node multicast address of the tentative address. The former insures that the node receives Neighbor Advertisements from other nodes already using the address; the latter insures that two nodes attempting to use the same address simultaneously detect each other's presence.

To check an address, a node sends DupAddrDetectTransmits Neighbor Solicitations, each separated by RetransTimer milliseconds. The solicitation's Target Address is set to the address being checked, the IP source is set to the unspecified address and the IP destination is set to the solicited-node multicast address of the target address.

If the Neighbor Solicitation is the first message to be sent from an interface after interface (re)initialization, the node should delay sending the message by a random delay between 0 and MAX_RTR_SOLICITATION_DELAY as specified in [DISCOVERY]. This serves to alleviate congestion when many nodes start up on the link at the same time, such as after a power failure, and may help to avoid race conditions when more than one node is trying to solicit for the same address at the same time. In order to improve the robustness of the Duplicate Address Detection algorithm, an interface MUST receive and process datagrams sent to the all-nodes multicast address or solicited-node multicast address of the tentative address while delaying transmission of the initial Neighbor Solicitation.

5.4.3. Receiving Neighbor Solicitation Messages

On receipt of a valid Neighbor Solicitation message on an interface, node behavior depends on whether the target address is tentative or not. If the target address is not tentative (i.e., it is assigned to the receiving interface), the solicitation is processed as described in [DISCOVERY]. If the target address is tentative, and the source address is a unicast address, the solicitation's sender is performing address resolution on the target; the solicitation should be silently ignored. Otherwise, processing takes place as described below. In all cases, a node MUST NOT respond to a Neighbor Solicitation for a tentative address.

If the source address of the Neighbor Solicitation is the unspecified address, the solicitation is from a node performing Duplicate Address Detection. If the solicitation is from another node, the tentative address is a duplicate and should not be used (by either node). If the solicitation is from the node itself (because the node loops back multicast packets), the solicitation does not indicate the presence of a duplicate address.

Implementor's Note: many interfaces provide a way for upper layers to selectively enable and disable the looping back of multicast packets. The details of how such a facility is implemented may prevent Duplicate Address Detection from working correctly. See the Appendix for further discussion.

The following tests identify conditions under which a tentative address is not unique:

If a Neighbor Solicitation for a tentative address is received prior to having sent one, the tentative address is a duplicate. This condition occurs when two nodes run Duplicate Address Detection simultaneously, but transmit initial solicitations at different times (e.g., by selecting different random delay values before transmitting an initial solicitation).

If the actual number of Neighbor Solicitations received exceeds the number expected based on the loopback semantics (e.g., the interface does not loopback packet, yet one or more solicitations was received), the tentative address is a duplicate. This condition occurs when two nodes run Duplicate Address Detection simultaneously and transmit solicitations at roughly the same time.

5.4.4. Receiving Neighbor Advertisement Messages

On receipt of a valid Neighbor Advertisement message on an interface, node behavior depends on whether the target address is tentative or matches a unicast or anycast address assigned to the interface. If the target address is assigned to the receiving interface, the solicitation is processed as described in [DISCOVERY]. If the target address is tentative, the tentative address is not unique.

5.4.5. When Duplicate Address Detection Fails

A tentative address that is determined to be a duplicate as described above, MUST NOT be assigned to an interface and the node SHOULD log a system management error. If the address is a link-local address formed from an interface identifier, the interface SHOULD be disabled.

5.5. Creation of Global and Site-Local Addresses

Global and site-local addresses are formed by appending an interface identifier to a prefix of appropriate length. Prefixes are obtained from Prefix Information options contained in Router Advertisements. Creation of global and site-local addresses and configuration of other parameters as described in this section SHOULD be locally configurable. However, the processing described below MUST be enabled by default.

5.5.1. Soliciting Router Advertisements

Router Advertisements are sent periodically to the all-nodes multicast address. To obtain an advertisement quickly, a host sends out Router Solicitations as described in [DISCOVERY].

5.5.2. Absence of Router Advertisements

If a link has no routers, a host MUST attempt to use stateful autoconfiguration to obtain addresses and other configuration information. An implementation MAY provide a way to disable the invocation of stateful autoconfiguration in this case, but the default SHOULD be enabled. From the perspective of autoconfiguration, a link has no routers if no Router Advertisements are received after having sent a small number of Router Solicitations as described in [DISCOVERY].

5.5.3. Router Advertisement Processing

On receipt of a valid Router Advertisement (as defined in [DISCOVERY]), a host copies the value of the advertisement's M bit into ManagedFlag. If the value of ManagedFlag changes from FALSE to TRUE, and the host is not already running the stateful address autoconfiguration protocol, the host should invoke the stateful address autoconfiguration protocol, requesting both address information and other information. If the value of the ManagedFlag changes from TRUE to FALSE, the host should continue running the stateful address autoconfiguration, i.e., the change in the value of the ManagedFlag has no effect. If the value of the flag stays unchanged, no special action takes place. In particular, a host MUST NOT reinvoke stateful address configuration if it is already participating in the stateful protocol as a result of an earlier advertisement.

An advertisement's O flag field is processed in an analogous manner. A host copies the value of the O flag into OtherConfigFlag. If the value of OtherConfigFlag changes from FALSE to TRUE, the host should invoke the stateful autoconfiguration protocol, requesting information (excluding addresses if ManagedFlag is set to FALSE). If the value of the OtherConfigFlag changes from TRUE to FALSE, the host should continue running the stateful address autoconfiguration protocol, i.e., the change in the value of OtherConfigFlag has no effect. If the value of the flag stays unchanged, no special action takes place. In particular, a host MUST NOT reinvoke stateful configuration if it is already participating in the stateful protocol as a result of an earlier advertisement.

For each Prefix-Information option in the Router Advertisement:

a) If the Autonomous flag is not set, silently ignore the Prefix Information option.

b) If the prefix is the link-local prefix, silently ignore the Prefix Information option.

c) If the preferred lifetime is greater than the valid lifetime, silently ignore the Prefix Information option. A node MAY wish to log a system management error in this case.

d) If the prefix advertised does not match the prefix of an address already in the list, and the Valid Lifetime is not 0, form an address (and add it to the list) by combining the advertised prefix with the link's interface identifier as follows:

If the sum of the prefix length and interface identifier length does not equal 128 bits, the Prefix Information option MUST be ignored. An implementation MAY wish to log a system management error in this case. It is the responsibility of the system administrator to insure that the lengths of prefixes contained in Router Advertisements are consistent with the length of interface identifiers for that link type. Note that interface identifiers will typically be 64-bits long and based on EUI-64 identifiers as described in [ADDR-ARCH].

If an address is formed successfully, the host adds it to the list of addresses assigned to the interface, initializing its preferred and valid lifetime values from the Prefix Information option.

e) If the advertised prefix matches the prefix of an autoconfigured address (i.e., one obtained via stateless or stateful address autoconfiguration) in the list of addresses associated with the interface, the specific action to perform depends on the Valid Lifetime in the received advertisement and the Lifetime associated with the previously autoconfigured address (which we call StoredLifetime in the discussion that follows):

1) If the received Lifetime is greater than 2 hours or greater than StoredLifetime, update the stored Lifetime of the corresponding address.

2) If the StoredLifetime is less than or equal to 2 hours and the received Lifetime is less than or equal to StoredLifetime, ignore the prefix, unless the Router Advertisement from which this Prefix Information option was obtained has been authenticated (e.g., via IPSec [RFC2402]). If the Router Advertisement was authenticated, the StoredLifetime should be set to the Lifetime in the received option.

3) Otherwise, reset the stored Lifetime in the corresponding address to two hours.

The above rules address a specific denial of service attack in which a bogus advertisement could contain prefixes with very small Valid Lifetimes. Without the above rules, a single unauthenticated advertisement containing bogus Prefix Information options with short Lifetimes could cause all of a node's addresses to expire prematurely. The above rules insure that legitimate advertisements (which are sent periodically) will "cancel" the short lifetimes before they actually take effect.

5.5.4. Address Lifetime Expiry

A preferred address becomes deprecated when its preferred lifetime expires. A deprecated address SHOULD continue to be used as a source address in existing communications, but SHOULD NOT be used in new communications if an alternate (non-deprecated) address is available and has sufficient scope. IP and higher layers (e.g., TCP, UDP) MUST continue to accept datagrams destined to a deprecated address since a deprecated address is still a valid address for the interface. An implementation MAY prevent any new communication from using a deprecated address, but system management MUST have the ability to disable such a facility, and the facility MUST be disabled by default.

An address (and its association with an interface) becomes invalid when its valid lifetime expires. An invalid address MUST NOT be used as a source address in outgoing communications and MUST NOT be recognized as a destination on a receiving interface.

5.6. Configuration Consistency

It is possible for hosts to obtain address information using both stateless and stateful protocols since both may be enabled at the same time. It is also possible that the values of other configuration parameters such as MTU size and hop limit will be learned from both Router Advertisements and the stateful autoconfiguration protocol. If the same configuration information is provided by multiple sources, the value of this information should be consistent. However, it is not considered a fatal error if information received from multiple sources is inconsistent. Hosts accept the union of all information received via the stateless and stateful protocols. If inconsistent information is learned different sources, the most recently obtained values always have precedence over information learned earlier.

6. SECURITY CONSIDERATIONS

Stateless address autoconfiguration allows a host to connect to a network, configure an address and start communicating with other nodes without ever registering or authenticating itself with the local site. Although this allows unauthorized users to connect to and use a network, the threat is inherently present in the Internet architecture. Any node with a physical attachment to a network can generate an address (using a variety of ad hoc techniques) that provides connectivity.

The use of Duplicate Address Detection opens up the possibility of denial of service attacks. Any node can respond to Neighbor Solicitations for a tentative address, causing the other node to reject the address as a duplicate. This attack is similar to other attacks involving the spoofing of Neighbor Discovery messages and can be addressed by requiring that Neighbor Discovery packets be authenticated [RFC2402].

7. REFERENCES

[RFC2402] Kent, S. and R. Atkinson, "IP Authentication Header", RFC 2402, November 1998.
[IPv6-ETHER] Crawford, M., "A Method for the Transmission of IPv6 Packets over Ethernet Networks", RFC 2464, December 1998.
[KEYWORDS] Bradner, S., "Key words for use in RFCs to Indicate Requirement Levels", BCP 14, RFC 2119, March 1997.
[RFC1112] Deering, S., "Host Extensions for IP Multicasting", STD 5, RFC 1112, August 1989.
[ADDR-ARCH] Hinden, R. and S. Deering, "Internet Protocol Version (IPv6) Addressing Architecture", RFC 2373, July 1998
[DHCPv6] Bound, J. and C. Perkins, "Dynamic Host Configuration Protocol for IPv6 (DHCPv6)", Work in Progress.
[DISCOVERY] Narten, T., Nordmark, E. and W. Simpson, "Neighbor Discovery for IP Version 6 (IPv6)", RFC 2461, December 1998.

8. ACKNOWLEDGEMENTS

The authors would like to thank the members of both the IPNG and ADDRCONF working groups for their input. In particular, thanks to Jim Bound, Steve Deering, Richard Draves, and Erik Nordmark. Thanks also goes to John Gilmore for alerting the WG of the "0 Lifetime Prefix Advertisement" denial of service attack vulnerability; this document incorporates changes that address this vulnerability.

Authors' Addresses
  Susan Thomson
  Bellcore
  445 South Street
  Morristown, N.J. 07960
  USA
  Phone: +1 201-829-4514
  EMail: set@thumper.bellcore.com
  Thomas Narten
  IBM Corporation
  P.O. Box 12195
  Research Triangle Park, N.C. 27709-2195
  USA
  Phone: +1 919 254 7798
  EMail: narten@raleigh.ibm.com

9. APPENDIX A

Loopback Suppression & Duplicate Address Detection

Determining whether a received multicast solicitation was looped back to the sender or actually came from another node is implementation-dependent. A problematic case occurs when two interfaces attached to the same link happen to have the same identifier and link-layer address, and they both send out packets with identical contents at roughly the same time (e.g., Neighbor Solicitations for a tentative address as part of Duplicate Address Detection messages). Although a receiver will receive both packets, it cannot determine which packet was looped back and which packet came from the other node by simply comparing packet contents (i.e., the contents are identical). In this particular case, it is not necessary to know precisely which packet was looped back and which was sent by another node; if one receives more solicitations than were sent, the tentative address is a duplicate. However, the situation may not always be this straightforward.

The IPv4 multicast specification [RFC1112] recommends that the service interface provide a way for an upper-layer protocol to inhibit local delivery of packets sent to a multicast group that the sending host is a member of. Some applications know that there will be no other group members on the same host, and suppressing loopback prevents them from having to receive (and discard) the packets they themselves send out. A straightforward way to implement this facility is to disable loopback at the hardware level (if supported by the hardware), with packets looped back (if requested) by software. On interfaces in which the hardware itself suppresses loopbacks, a node running Duplicate Address Detection simply counts the number of Neighbor Solicitations received for a tentative address and compares them with the number expected. If there is a mismatch, the tentative address is a duplicate.

In those cases where the hardware cannot suppress loopbacks, however, one possible software heuristic to filter out unwanted loopbacks is to discard any received packet whose link-layer source address is the same as the receiving interface's. Unfortunately, use of that criteria also results in the discarding of all packets sent by another node using the same link-layer address. Duplicate Address Detection will fail on interfaces that filter received packets in this manner:

If a node performing Duplicate Address Detection discards received packets having the same source link-layer address as the receiving interface, it will also discard packets from other nodes also using the same link-layer address, including Neighbor Advertisement and Neighbor Solicitation messages required to make Duplicate Address Detection work correctly. This particular problem can be avoided by temporarily disabling the software suppression of loopbacks while a node performs Duplicate Address Detection.

If a node that is already using a particular IP address discards received packets having the same link-layer source address as the interface, it will also discard Duplicate Address Detection-related Neighbor Solicitation messages sent by another node also using the same link-layer address. Consequently, Duplicate Address Detection will fail, and the other node will configure a non-unique address. Since it is generally impossible to know when another node is performing Duplicate Address Detection, this scenario can be avoided only if software suppression of loopback is permanently disabled.

Thus, to perform Duplicate Address Detection correctly in the case where two interfaces are using the same link-layer address, an implementation must have a good understanding of the interface's multicast loopback semantics, and the interface cannot discard received packets simply because the source link-layer address is the same as the interfaces.

10. APPENDIX B

Changes Since RFC 1971

Changed document to use term "interface identifier" rather than "interface token" for consistency with other IPv6 documents.

Clarified definition of deprecated address to make clear it is OK to continue sending to or from deprecated addresses.

Reworded section 5.4 for clarity (no substantive change).

Added rules to Section 5.5.3 Router Advertisement processing to address potential denial-of-service attack when prefixes are advertised with very short Lifetimes.

Clarified wording in Section 5.5.4 to make clear that all upper layer protocols must process (i.e., send and receive) packets sent to deprecated addresses.

11. FULL COPYRIGHT STATEMENT

Copyright (C) The Internet Society (1998). All Rights Reserved.

This document and translations of it may be copied and furnished to others, and derivative works that comment on or otherwise explain it or assist in its implementation may be prepared, copied, published and distributed, in whole or in part, without restriction of any kind, provided that the above copyright notice and this paragraph are included on all such copies and derivative works. However, this document itself may not be modified in any way, such as by removing the copyright notice or references to the Internet Society or other Internet organizations, except as needed for the purpose of developing Internet standards in which case the procedures for copyrights defined in the Internet Standards process must be followed, or as required to translate it into languages other than English.

The limited permissions granted above are perpetual and will not be revoked by the Internet Society or its successors or assigns.

This document and the information contained herein is provided on an "AS IS" basis and THE INTERNET SOCIETY AND THE INTERNET ENGINEERING TASK FORCE DISCLAIMS ALL WARRANTIES, EXPRESS OR IMPLIED, INCLUDING BUT NOT LIMITED TO ANY WARRANTY THAT THE USE OF THE INFORMATION HEREIN WILL NOT INFRINGE ANY RIGHTS OR ANY IMPLIED WARRANTIES OF MERCHANTABILITY OR FITNESS FOR A PARTICULAR PURPOSE.

APPENDIX II

IPv6 Stateless DNS Discovery Draft (Work in Progress)

| | |
|---|---|
| Network Working Group | Dave Thaler |
| INTERNET-DRAFT | Microsoft |
| Mar. 1, 2002 | Jun-ichiro itojun Hagino |
| Expires August 2002 | IIJ Research Laboratory |

IPv6 Stateless DNS Discovery

<draft-ietf-ipv6-dns-discovery-04.txt>

Status of this Memo

This document is an Internet-Draft and is in full conformance with all provisions of Section 10 of RFC2026.

Internet-Drafts are working documents of the Internet Engineering Task Force (IETF), its areas, and its working groups. Note that other groups may also distribute working documents as Internet-Drafts.

Internet Drafts are valid for a maximum of six months and may be updated, replaced, or obsoleted by other documents at any time. It is inappropriate to use Internet Drafts as reference material or to cite them other than as a "work in progress".

To view the list Internet-Draft Shadow Directories, see http://www.ietf.org/shadow.html.

Abstract

This document specifies the steps a host takes in deciding how to autoconfigure the addresses of DNS Servers required for name resolution in IP version 6. The autoconfiguration process includes determining whether such information should be obtained through the stateless mechanism, the stateful mechanism, or both. This document defines the process for acquiring a list of DNS server addresses. Approaches for acquiring a domain search path, and the domain name of the host via a stateless mechanism are included in an appendix for further study. The details of autoconfiguration using the stateful protocol are specified elsewhere.

Copyright Notice

Copyright (C) The Internet Society (2002). All Rights Reserved.

1. INTRODUCTION

RFC 2462 [ADDRCONF] specifies "OtherConfigFlag" as a per-interface variable, which is set from the value of the "O" ("Other stateful configuration") flag in Router Advertisements received. When OtherConfigFlag is set on an interface, information related to name resolution is obtained using the stateful autoconfiguration mechanism. However, when OtherConfigFlag is not set, it does not describe how to obtain such information. This is the purpose of this document.

For a host to effectively resolve names of other hosts, and potentially allow resolution of its name to be performed, the following parameters are typically required:

- One or more addresses of Domain Name Service (DNS) [RFC1034, RFC1035] servers. The function of name-to-address resolution (or vice versa) in IP is performed by DNS, which requires that at least one DNS Server be known and reachable by a device desiring to perform name resolution.
- A per-interface domain name of the host itself, and is equivalent to the Domain Name option in [DHCP]. This can be used when Multicast DNS is enabled, and the host responds to queries for its own name, as well as when DNS Dynamic Update is enabled. Depending on the implementation, the per-interface domain name may or may not be the same thing as the primary domain name of the host.
- Search path. It is currently common practice for the search path to be computed by a device based on its domain name(s). However, a DHCP option [DOMSEARCH] has been proposed, and so search path configuration is likely to be a requirement in general.
- mDNS-enabled flag. This parameter controls whether Multicast DNS [MDNS] should be enabled on the host's interface.

A design team recommendation [DDDT] contains an analysis of the requirements and solution space, which was used as the basis for this document. One result of this analysis was that there is a spectrum of configuration/discovery mechanisms. At one end, a single protocol is used to configure/discovery all types of information. This style works well in an administered environment where a network administrator wants to have a central point of control, and apply policies, etc. At the other end, each protocol is self-configuring, rather than depending on any other protocol or server. This style provides optimal fate sharing, and works well in zero-configuration environments such as adhoc networks and simple networks without network administrator staff. The former mechanism is used with the "Other stateful configuration" flag is used, and this draft provides the benefits (and limitations) of the latter approach when "Other stateful configuration" is not set.

Note: This document only includes in its body a solution for obtaining the address of Domain Name Service servers. Mechanisms for obtaining the other parameters listed above are included in an Appendix A for further study. These may be moved to a separate document in the future.

2. OVERVIEW

A set of three well-known site-local IPv6 addresses are reserved for autodiscovery of DNS servers. These addresses may be used as unicast addresses assigned to different servers. The use of the addresses as anycast addresses with one of them being assigned to all DNS servers in the site, or any combination of anycast and unicast addresses, is for further study.

Host routes for these addresses are propagated in the site's routing tables. This document proposes that these three addresses be:

fec0:0:0:ffff::1
fec0:0:0:ffff::2
fec0:0:0:ffff::3

This list of three addresses may be hardcoded into a host.

Furthermore, we define two levels of functionality. Level 1 is defined below. Level 2 is described in Appendix A and is for further study.

3. LEVEL 1 COMPLIANCE

Level 1 compliance entails using the three addresses above for actual name resolution. It provides only rudimentary functionality. In particular, it does not provide the ability to have separate configuration for hosts on different subnets, nor to provide hosts with a domain name other than one for which the DNS server is authoritative.

3.1. DNS Server Configuration

Level 1 functionality requires no DNS server configuration other than assigning one of the well-known addresses to one of the server's interfaces. A host route must then be injected into the routing domain, e.g., by configuring a static host route on the server's router, and redistributing it into the intra-domain routing protocol.

A host route must then be injected into the site's routing infrastructure. Route injection can be done via any of several methods, including but not limited to:

a) Run the server on a router, and configure it to inject the host route.

b) Run a routing protocol on the server, and configure it to inject the host route. Note that this requires that the server and its router(s) must run the same routing protocol, at least for communication between the router(s) and the server(s) on the link. However, a server does not need to participate fully in the routing protocol, it only needs to be able to inject routes.

c) Run multiple servers on the same link(s), and configure their local router(s) to inject host routes for the well-known address into the site's routing infrastructure. Running multiple servers on the same link provides robustness to the failure of a server, while routing provides robustness to the loss of routers and other links. There may still be some failures, however, such as a unidirectional failure of the router's interface, which are not handled by this option.

d) Modify the routers on the link to periodically solicit (using Neighbor Discovery) the well-known address, and inject the host route based on whether a reply is received.

3.2. Host Behavior

The host sets its DNS server list equal to the set of three addresses listed above. The search path is not discovered, but is generated from the host's domain name(s) as is currently common practice. If desired, a per-interface domain name can be obtained by sending a query (with the Recursion Desired (RD) bit set), doing a reverse lookup for the well-known site-local IPv6 destination address, and extracting the domain name from the NS record in the reply.

4. SECURITY CONSIDERATIONS

Ensuring that queries reach a legitimate DNS server relies on the security of the IPv6 routing infrastructure. The issues here are the same as those for protecting basic IPv6 connectivity.

IPsec/IKE can be used when the well-known addresses are used as unicast addresses.

The payload can be protected as follows. If the client can preconfigure a well known private or public key then TSIG [TSIG] can be used with the same packets presented for the query. If this is not the case, then TSIG keys will have to be negotiated using [TKEY]. After the client has the proper key then the query can be performed.

5. IANA CONSIDERATIONS

The IANA should assign the following site-local IPv6 addresses to be used as well-known addresses assigned to DNS servers:

fec0:0:0:ffff::1
fec0:0:0:ffff::2
fec0:0:0:ffff::3

[Note to readers: the above addresses are tentative, but the ffff is intended to be consistent with a simultaneous proposal to reserve the ffff SLA for use with IANA-assigned addresses such as these.]

6. ACKNOWLEDGEMENTS

The IPv6 DNS Discovery Design Team [DDDT] provided recommendations that formed the basis of this specification. Rob Austein and the IPv6 Working Group provided valuable feedback on the mechanism. Aaron Schrader provided helpful comments as well. Robert Hinden edited this version of the document.

7. REFERENCES

[ADDRCONF]
Thomson, S., and T. Narten, "IPv6 Stateless Address Autoconfiguration", RFC 2462, December 1998.
[ANYCAST]
Hagino, Jun-ichiro itojun, and K. Ettikan, "An analysis of IPv6 anycast", draft-ietf-ipngwg-ipv6-anycast-analysis-00.txt, Work in progress, July 2001.
[DDDT]
Thaler, D., Editor, "Analysis of DNS Server Discovery Mechanisms for IPv6", draft-ietfipngwg-dns-discovery-analysis-00.txt
[DIFFSEC]
D. Eastlake, "Storage of Diffie-Hellman Keys in the Domain Name System (DNS)", RFC 2539, March 1999.
[DNSSEC]
D. Eastlake, "Domain Name System Security Extensions", RFC 2535, March 1999.
[DOMSEARCH]
B. Aboba, "DHCP Domain Search Option", draft-aboba-dhc-domsearch-01.txt, December 2000.
[MDNS]
Esibov, L., Aboba, B., and D. Thaler, draft-ietf-dnsext-mdns-03.txt, July 2001.
[TKEY]
D. Eastlake, "Secret Key Establishment for DNS (TKEY RR)" RFC 2930, September 2000.
[TSIG]
Vixie, P., Gudmundsson, O., Eastlake, D. and B. Wellington, "Secret Key Transaction Authentication for DNS (TSIG)", RFC 2845, May 2000.

8. AUTHORS' ADDRESSES

Dave Thaler
Microsoft
One Microsoft Way
Redmond, Calif. 98052, USA
Email: dthaler@microsoft.com
Jun-ichiro itojun HAGINO
Research Laboratory, Internet Initiative Japan Inc.
Takebashi Yasuda Bldg.,
3-13 Kanda Nishiki-cho,
Chiyoda-ku, Tokyo 101-0054, JAPAN
Email: itojun@iijlab.net

9. APPENDIX A

Level 2 Compliance

Level 2 compliance allows site administrators to have site-wide defaults for all name resolution parameters, and optionally to have subnet-specific overrides. However, it defines a new DNS record type to hold name resolution configuration information. In this way, DNS becomes self-configuring.

9.1. DNS Server Configuration

A new record type, CFG, is defined, with a syntax as follows:     <owner><class><ttl>CFG      "<attribute name>=<attribute value>"

The set of attribute names is described below. This set may be extended by other RFCs, but any new attributes MUST be specific to name resolution.

The DNS server list is expressed with a string of the form "dnsservers=<address>[,<address>]*" where the attribute value is a comma-separated list of one or more addresses (either IPv4 or IPv6) in string literal format suitable for passing to getaddrinfo.

The domain name to use is expressed with a string of the form "domainname=<domain>" where the attribute value is the domain name the client should use.

The domain suffix search path is expressed with a string of the form "searchpath=<domain>[,<domain>]*" where the attribute value is a comma-separated list of domain suffixes.

The mDNS enabled flag is expressed with a string of the form "mdnsenabled=<value>" where the attribute value is either "true" or "false".

Name resolution information can be expressed as defaults for the entire site, as well as per-subnet overrides if desired. To express site defaults, the record owner used is a wildcard, namely *.local.arpa. The format of per-subnet overrides is described in the next section.

[NOTE WELL: the use of "local.arpa" and the CFG record syntax shown above are just placeholders until DNS experts figure out what the right thing is.]

Each of the attributes described herein are optional, and any combination may be used, except that only one record per attributename should be present per owner (site or subnet) string.

TABLE 1

| Example configuration | | | |
|---|---|---|---|
| *.local.arpa | IN | CFG | "dnsservers = fec0:0:1::1, fec0:0:2::2" |
| *.local.arpa | IN | CFG | "domainname = example.com" |
| *.local.arpa | IN | CFG | "searchpath = foo.example.com, bar.example.com, example.com" |
| *.local.arpa | IN | CFG | "mdnsenabled = true" |

The DNS server must also be assigned one of the well-known site-local addresses, and a host route must be injected into the site's routing infrastructure, e.g. using one of the methods described above in Section 3.1.

9.2. Host Behavior

When an interface comes up, and a host determines that the OtherConfigFlag on the interface is off, then it takes the following actions.

The host constructs a DNS query for CFG records for ".local.arpa.", where is constructed from an onlink prefix as follows:

1) Determine the onlink prefix to use. Any onlink site-local prefix is used, if present. Otherwise, any onlink global prefix is used. If no other onlink prefixes are present (e.g., if no routers are present), the link-local prefix is used as a last resort.
2) Convert the subnet prefix to a string by taking the lower case string literal representation, with no zero compression, and replacing all colons with underscores. Table 2 below shows some examples. This notation is used so that it uses only one token, is unique per prefix, and is human readable.

TABLE 2

Example queries

| Prefix | String |
| --- | --- |
| fec0:0:0:1::/64 | fec0_0000_0000_0001.local.arpa |
| 3ffe:ffff:0:1234::/64 | 3ffe_ffff_0000_1234.local.arpa |
| fe80::/64 | fe80_0000_0000_0000.local.arpa |

Once the query is formed, the host initially sends out the query using UDP to each discovery address in turn until a reply is received, or until the end of the list is reached. To avoid implosion problems when an entire site reboots such as after a power outage, the first request should wait 3 seconds for a reply, with the wait period doubling for each subsequent request.

Since the destination address may be an anycast address, the reply will necessarily come from a different address. The host must not discard the reply simply because the source address is different. A more detailed discussion of this issue can be found in [ANYCAST].

Upon receiving a response, the host parses the CFG records and acts on the information as follows.

If a dnsservers attribute is present, the list of server addresses is extracted from the value. If no such attribute is present (or if no reply is received), an implementation-specific default list is used. For example:

an implementation MAY use an empty list (effectively disabling name resolution), a host MAY use a DNS server list containing only the anycast address, subject to the limitations discussed in the next section, a host MAY use mDNS [MDNS] only, or a host MAY use some combination of the above.

In general, the list obtained is used in the same way as if the list had been obtained (or failed to be obtained) via DHCP.

If a domainname attribute is present, the domain name is extracted from the value. The domain name (or lack thereof) is used in the same way as if the list had been obtained (or failed to be obtained) via DHCP.

If the searchpath attribute is present, the search path is extracted from the value. If not present, the host uses the search path it would use if no path had been obtained if DHCP were in use.

If the mdnsenabled attribute is present, the value is extracted. If not present, mDNS is not enabled.

10. FULL COPYRIGHT STATEMENT

Copyright (C) The Internet Society (2001). All Rights Reserved. This document and translations of it may be copied and furnished to others, and derivative works that comment on or otherwise explain it or assist in its implementation may be prepared, copied, published and distributed, in whole or in part, without restriction of any kind, provided that the above copyright notice and this paragraph are included on all such copies and derivative works. However, this document itself may not be modified in any way, such as by removing the copyright notice or references to the Internet Society or other Internet organizations, except as needed for the purpose of developing Internet standards in which case the procedures for copyrights defined in the Internet languages other than English. The limited permissions granted above are perpetual and will not be revoked by the Internet Society or its successors or assigns. This document and the information contained herein is provided on an "AS IS" basis and THE INTERNET SOCIETY AND THE INTERNET ENGINEERING TASK FORCE DISCLAIMS ALL WARRANTIES, EXPRESS OR IMPLIED, INCLUDING BUT NOT LIMITED TO ANY WARRANTY THAT THE USE OF THE INFORMATION HEREIN WILL NOT INFRINGE ANY RIGHTS OR ANY IMPLIED WARRANTIES OF MERCHANTABILITY OR FITNESS FOR A PARTICULAR PURPOSE.

What is claimed is:

1. A method of maintaining Internet domain name data, comprising the steps of:

automatically generating an IP address of a host node attached to the Internet, said step of automatically generating an IP address of a host node being performed automatically by said host node;

defining an Internet domain name for said host node;

automatically generating and transmitting a request to update domain name data relating to said host node, said domain name data residing in a first domain name server, said request being transmitted from said host node and addressed to said first domain name server, said request including said IP address generated by said automatically generating step; and automatically updating domain name data in said first domain name server responsive to receiving said request at said first domain name server, said automatically updating step associating said IP address generated by said automatically generating step with said Internet domain name for said host node.

2. The method of claim 1, further comprising the step of:

automatically discovering the identity of said first domain name server from a response to at least one query generated by said host node and transmitted to at least one other node.

3. The method of claim 2, wherein said step of automatically discovering the identity of said first domain name server comprises:

automatically determining the identity of a local domain name server, said local domain name server being attached to a local network to which said host node is attached; and automatically obtaining the identity of said first domain name server from said local domain name server.

4. The method of claim 1, wherein said first domain name server is a master domain name server which authoritatively maintains domain name records for nodes within an Internet zone, said zone including said host node.

5. The method of claim 1, wherein said step of automatically generating an IP address for said host node comprises the steps of:
   automatically generating a link-local address for said host node recognizable on a local link, said automatically generating a link-local address being performed by said host node;
   automatically soliciting information from a router connected to said local link;
   receiving information in said host node from said router responsive to said automatically soliciting step, said information including a portion of an IP address for said host node; and
   automatically constructing said IP address from said portion of an IP address received from said router and said link-local address, said automatically constructing step being performed by said host node.

6. The method of claim 5, wherein said step of automatically generating an IP address for said host node further comprises the step of:
   automatically verifying the uniqueness of said link-local address on said local link.

7. The method of claim 1, wherein said step of defining an Internet domain name for said host node comprises:
   automatically determining a zone common portion of said Internet domain name, said zone common portion being common to a plurality of nodes within an Internet zone;
   defining a zone unique portion of said Internet domain name, said zone unique portion being unique to said host node within said Internet zone; and
   combining said zone unique portion with said zone common portion.

8. The method of claim 7, wherein said step of automatically determining a zone common portion of said Internet domain name comprises:
   obtaining said zone common portion from a domain name server.

9. The method of claim 1, wherein said step of automatically transmitting a request to update domain name data comprises encrypting at least a portion of said request.

10. The method of claim 9,
    wherein said step of automatically transmitting a request to update domain name data comprises encrypting a requester identifier with said request to update domain name data; and
    wherein said automatically updating domain name data step comprises verifying said requestor identifier, and updating domain name data only if said requestor identifier is successfully verified, said verifying and updating steps being performed by said first domain name server.

11. The method of claim 10,
    wherein said step of automatically transmitting a request to update domain name data further comprises automatically generating a first requestor identifier at said host node, said first requestor identifier being unique to said host node; and
    wherein said step of verifying said requestor identifier comprises:
    (a) if said domain name is a new domain name, then generating a new domain name record for said domain name and saving said first requestor identifier with said domain name record; and
    (b) if said domain name is not a new domain name, then comparing a second requestor identifier, said second requestor identifier being saved in a domain name record associated with said domain name, with the first requestor identifier, and verifying the requestor identifier only if the first and second requestor identifiers are identical.

12. The method of claim 9, wherein encrypting at least a portion of said request comprises encrypting said at least a portion of said request according to a public/private key encryption algorithm using a public key for said first domain name server.

13. The method of claim 1, wherein said step of automatically transmitting a request to update domain name data comprises generating a request according to one of the set consisting of: a BIND 8 protocol, a BIND 9 protocol, and a subsequent version of a BIND protocol.

14. The method of claim 1, wherein said step of automatically updating data in said first domain name server comprises generating a new database record for said domain name, said new record associating said IP address with said domain name.

15. The method of claim 1, wherein said step of automatically updating data in said first domain name server comprises updating an existing database record for said domain name to associate said IP address with said domain name in said existing record.

16. A computer program product for supporting Internet access in a host node computer system coupled to the Internet, said computer program product comprising:
    a plurality of processor executable instructions recorded on signal-bearing media, wherein said instructions, when executed by at least one processor in said host node, cause said host node to perform the steps of:
    automatically generating an IP address of said host node, said step of automatically generating an IP address of a host node being performed automatically by said host node;
    receiving data defining an Internet domain name for said host node; and
    automatically generating and transmitting a request to update domain name data relating to said host node, said domain name data residing in a first domain name server, said request being transmitted from said host node and addressed to said first domain name server, said request including said IP address generated by said automatically generating step;
    wherein said first domain name server automatically updates its domain name data responsive to receiving said request by associating said IP address generated by said automatically generating step with said Internet domain name for said host node.

17. The computer program product of claim 16, wherein said instruction further cause said host node to perform the step of:
    automatically discovering the identity of said first domain name server from a response to at least one query generated by said host node and transmitted to at least one other node.

18. The computer program product of claim 17, wherein said step of automatically discovering the identity of said first domain name server comprises:

automatically determining the identity of a local domain name server, said local domain name server being attached to a local network to which said host node is attached; and automatically obtaining the identity of said first domain name server from said local domain name server.

19. The computer program product of claim 16, wherein said step of automatically generating an IP address for said host node comprises the steps of:

automatically generating a link-local address for said host node recognizable on a local link, said automatically generating a link-local address being performed by said host node;

automatically soliciting information from a router connected to said local link;

receiving information in said host node from said router responsive to said automatically soliciting step, said information including a portion of an IP address for said host node; and automatically constructing said IP address from said portion of an IP address received from said router and said link-local address, said automatically constructing step being performed by said host node.

20. The computer program product of claim 16, wherein said step of receiving data defining an Internet domain name for said host node comprises:

automatically obtaining a zone common portion of said Internet domain name from a domain name server, said zone common portion being common to a plurality of nodes within an Internet zone;

defining a zone unique portion of said Internet domain name, said zone unique portion being unique to said host node within said Internet zone; and combining said zone unique portion with said zone common portion.

21. The computer program product of claim 16, wherein said step of automatically transmitting a request to update domain name data comprises encrypting at least a portion of said request according to a public/private key encryption algorithm using a public key for said first domain name server.

22. The computer program product of claim 21, wherein said step of automatically transmitting a request to update domain name data comprises automatically generating a requestor identifier at said host node, said requestor identifier being unique to said host node, and encrypting said requester identifier with said request to update domain name data; and wherein said first domain name server automatically verifies said requestor identifier, and updating domain name data only if said requestor identifier is successfully verified.

23. The computer program product of claim 16, wherein said step of automatically transmitting a request to update domain name data comprises generating a request according to one of the set consisting of: a BIND 8 protocol, a BIND 9 protocol, and a subsequent version of a BIND protocol.

24. A computer system coupled to the Internet and forming a host node of the Internet, comprising:

an Internet interface;

at least one processor;

an Internet access utility executable on said at least one processor which self-configures said host node to a first domain name server maintaining domain name data for a plurality of nodes including said host node, said Internet access utility automatically generating an IP address of a said host node, and automatically generating and transmitting a request to update domain name data relating to said host node to said first domain name server, said domain name data residing in said first domain name server, said request including said IP address, said request being transmitted from said host node as a communication addressed to said first domain name server.

25. The computer system of claim 24, wherein said Internet access utility further automatically discovers the identity of said first domain name server from a response to at least one query generated by said host node and transmitted to at least one other node.

26. The computer system of claim 25, wherein said Internet access utility automatically discovers the identity of said first domain name server by:

automatically determining the identity of a local domain name server, said local domain name server being attached to a local network to which said host node is attached; and automatically obtaining the identity of said first domain name server from said local domain name server.

27. The computer system of claim 24, wherein said Internet access utility automatically generates an IP address for said host node by:

automatically generating a link-local address for said host node recognizable on a local link;

automatically soliciting information from a router connected to said local link;

receiving information in said host node from said router responsive to said automatically soliciting step, said information including a portion of said IP address for said host node; and automatically constructing said IP address from said portion of said IP address received from said router and said link-local address.

28. The computer system of claim 27, wherein said Internet access utility further generates an IP address for said host node by:

automatically verifying the uniqueness of said link-local address on said local link.

29. The computer system of claim 24, wherein said Internet access utility determines an Internet domain name for said host node by:

automatically obtaining a zone common portion of said Internet domain name from a domain name server, said zone common portion being common to a plurality of nodes within an Internet zone;

defining a zone unique portion of said Internet domain name, said zone unique portion being unique to said host node within said Internet zone; and combining said zone unique portion with said zone common portion.

30. The computer system of claim 24, wherein said Internet access utility automatically encrypts at least a portion of said request to update domain name data according to a public/private key encryption algorithm using a public key for said first domain name server.

31. The computer system of claim 30, wherein said Internet access utility automatically generates a requestor identifier at said host node, said requestor identifier being unique to said host node, and encrypts said requester identifier with said request to update domain name data, and wherein said first domain name server automatically verifies said requestor identifier, and updates domain name data only if said requestor identifier is successfully verified.

32. The computer system of claim 24, wherein said Internet access utility generates said request to update domain name data according to one of the set consisting of: a BIND 8 protocol, a BIND 9 protocol, and a subsequent version of a BIND protocol.

33. An apparatus which maintains Internet domain name data, comprising:
- a plurality of host nodes connected to the Internet;
- a first domain name server connected to the Internet, said first domain name server maintaining domain name data for an Internet zone, said zone including said plurality of host nodes;
- a respective Internet access mechanism in each of said plurality of host nodes, each said Internet access mechanism automatically generating one or more IP addresses for its host node and automatically generating and transmitting a request to update said domain name data for an Internet zone in said first domain name server, each said request being transmitted from its respective host node and addressed to said first domain name server, each said request including a respective IP address automatically generated by the respective Internet access mechanism in the requesting host node and a respective domain name of the requesting host node; and
- a domain name database mechanism in said first domain name server, said domain name database mechanism responding to a request to update said domain name data received from one of said plurality of host nodes by automatically updating said domain name data, said domain name data being updated by associating the IP address contained in the request with the domain name of the requesting host node.

34. The apparatus of claim 33, further comprising:
- a router connected to the Internet; and
- a local area network connected to said router;
- wherein at least some of said plurality of host nodes are coupled to said local area network and communicate with at least some other Internet nodes through said router.

35. The apparatus of claim 34, wherein each said Internet access mechanism generates an IP address for its host node by:
- automatically generating a link-local address for said host node recognizable on said local area network;
- automatically soliciting information from said router;
- receiving information in said host node from said router responsive to said automatically soliciting step, said information including a portion of said IP address for said host node; and
- automatically constructing said IP address from said portion of said IP address received from said router and said link-local address.

36. The apparatus of claim 34, further comprising:
- a local domain name server coupled to said local area network.

37. The apparatus of claim 36, wherein each said Internet access mechanism automatically discovers the identity of said first domain name server by:
- automatically determining the identity of said local domain name server; and
- automatically obtaining the identity of said first domain name server from said local domain name server.

38. The apparatus of claim 33, wherein each said Internet access mechanism encrypts at least a portion of said request to update domain name data according to a public/private key encryption algorithm using a public key for said first domain name server.

39. The apparatus of claim 38,
- wherein each said Internet access mechanism encrypts a requester identifier with said request to update domain name data; and
- wherein said domain name database mechanism verifies said requestor identifier, and updates said domain name data only if said requestor identifier is successfully verified.

40. The apparatus of claim 33, wherein each said Internet access mechanism generates said request to update domain name data according to one of the set consisting of: a BIND 8 protocol, a BIND 9 protocol, and a subsequent version of a BIND protocol.

* * * * *